US008619803B2

(12) United States Patent
Gunther et al.

(10) Patent No.: US 8,619,803 B2
(45) Date of Patent: Dec. 31, 2013

(54) SPARSE MODE SYSTEM

(75) Inventors: Craig Gunther, Salt Lake City, UT (US); Levi Pearson, Lehi, UT (US); Dong He, Shenzhen (CN)

(73) Assignee: Harman International Industries, Incorporated, Stamford, CT (US)

( * ) Notice: Subject to any disclaimer, the term of this patent is extended or adjusted under 35 U.S.C. 154(b) by 230 days.

(21) Appl. No.: 13/101,254

(22) Filed: May 5, 2011

(65) Prior Publication Data

US 2012/0284739 A1 Nov. 8, 2012

(51) Int. Cl.
*H04B 7/212* (2006.01)
(52) U.S. Cl.
USPC ........... 370/443; 370/431; 370/348; 370/322; 709/226; 709/231
(58) Field of Classification Search
USPC ........... 370/431, 348, 322, 230; 709/226, 231
See application file for complete search history.

(56) References Cited

U.S. PATENT DOCUMENTS

| | | | | |
|---|---|---|---|---|
| 2005/0198261 | A1* | 9/2005 | Durvasula et al. | 709/224 |
| 2008/0086568 | A1  | 4/2008 | Badt et al. | |
| 2008/0298241 | A1* | 12/2008 | Ohana et al. | 370/235 |
| 2012/0026951 | A1* | 2/2012 | Mace et al. | 370/329 |
| 2012/0036267 | A1* | 2/2012 | Finn | 709/226 |
| 2012/0099605 | A1* | 4/2012 | Stanton | 370/463 |
| 2012/0113987 | A1* | 5/2012 | Riddoch et al. | 370/390 |

OTHER PUBLICATIONS

"IEEE Standard for Local and Metropolitan Area Networks—Virtual Bridged Local Area Networks Amendment 14: Stream Reservation Protocol (SRP); IEEE Std 802.1Q-2010 (Revision of IEEE Std 802.1Q-2005)", IEEE Standard, IEEE, Piscataway, NJ, USA, Sep. 30, 2010, 119 pages, XP017604406, ISBN: 978-0/7381-6501-1.
Thomas Pike et al., "IPv6 and multicast filtering for high-performance multimedia applications", Telecommunication Networks and Applications Conference 2007. ATNAC 2007. Australasian, IEEE, Piscataway, NN, USA, Dec. 2, 2007, pp. 146-150, XP031356808, ISBN: 978-1-4244-1557-1.
European Search Report dated Sep. 14, 2012 for corresponding European Application No. 12 16 6788.
IEEE Std. 802.1AS-2011, *Timing and Synchronization for Time-Sensitive Applications in Bridged Local Area Networks*, Mar. 30, 2011 (292 pp.).
IEEE Std. 802.1Qat-2010, *Virtual Bridged Local Area Networks Amendment 14*: Stream Reservation Protocol (SRP), Sep. 30, 2010 (119 pp.).
IEEE Std. 802.1Qav-2009, *Virtual Bridging Local Area Networks Amendment 12: Forwarding and Queuing Enhancements for Time-Sensitive Streams*, Jan. 5, 2010 (87 pp.).

* cited by examiner

*Primary Examiner* — Omer Mian
(74) *Attorney, Agent, or Firm* — Brinks Hofer Gilson & Lione

(57) ABSTRACT

A listener system, or listener, may be used with an Ethernet Audio-Video Bridging ("AVB") network. The listener may include various components, such as an upper layer application and a stream reservation protocol stack. The upper layer application and stream reservation protocol stack may be in communication with each other. The stream reservation protocol stack may receive stream advertisements on or across the Ethernet AVB network. The stream reservation protocol stack may operate in a sparse mode and may operate in a full mode. When operating in a sparse mode, the stream reservation protocol stack may transmit one subset of the received stream advertisements to the upper layer application, and may not transmit another subset of the received stream advertisements to the upper layer application.

24 Claims, 10 Drawing Sheets

SPARSE MODE SYSTEM

BACKGROUND OF THE INVENTION

1. Technical Field

This invention relates to a listener system for use with an Ethernet Audio-Video Bridging ("AVB") network, a method of operating a stream reservation protocol stack of a listener connected with an Ethernet Audio-Video Bridging ("AVB") network, and a network communication system.

2. Related Art

With continued technological developments, an increasing number of devices may interact and communicate with each other through various networks. As more devices communicate and interact with each other, more data may be passed through a network and to each connected device. Therefore, a need exists for a device and/or system that increases and/or maximizes efficiency and resources for one or more devices in the network, such as those devices which may have limited resources.

SUMMARY

A listener system, or listener, may be used with an Ethernet Audio-Video Bridging ("AVB") network. The listener may include various components, such as an upper layer application and a stream reservation protocol stack. The upper layer application and stream reservation protocol stack may be in communication with each other. The stream reservation protocol stack may receive stream advertisements on or across the Ethernet AVB network. The stream reservation protocol stack may operate in a sparse mode and may operate in a full mode. When operating in a sparse mode, the stream reservation protocol stack may transmit one subset of the received stream advertisements to the upper layer application, and may not transmit another subset of the received stream advertisements to the upper layer application.

A stream reservation protocol stack of a listener may be connected with an Ethernet AVB network. The listener may include an upper layer application and the stream reservation protocol stack. The stream reservation protocol stack may be operated according to various methods. In one method, the stream reservation protocol stack may receive a plurality of stream advertisements from the Ethernet AVB network. The stream reservation protocol stack may transmit the plurality of stream advertisements to the upper layer application when functioning in full mode. When functioning in sparse mode, the stream reservation protocol stack may transmit a first subset of the received stream advertisements to the upper layer application and not transmit a second subset of received stream advertisements to the upper layer application.

A network communication system may include an Ethernet AVB network, a talker, and a number of listeners. The talker and the listeners may all be in communication with the Ethernet AVB network. The talker may advertise a data stream on the Ethernet AVB network with a stream advertisement. The listeners may be configured to operate in a sparse mode and in a full mode. In the sparse mode, the listeners may compare the stream advertisement to one or more stream identifiers associated with one or more data streams of interest to the listener.

A computer program product may have a computer readable medium tangibly embodying computer executable code for operating a stream reservation protocol stack of a listener system connected with an Ethernet Audio-Video Bridging ("AVB") network. The product may include code for receiving a number of stream advertisements from the Ethernet AVB network with a stream reservation protocol stack included in the listener system. The product may also include code for transmitting the number of stream advertisements to an upper layer application included in the listener system when the listener system is functioning in a full mode. In addition, the product may include code for transmitting a first subset of the received stream advertisements to the upper layer application and not transmitting a second subset of the received stream advertisements to the upper layer application when the listener system is operating in a sparse mode.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Demand for connectivity between network devices continues to increase at a fast rate. In many systems, a greater number of devices are being manufactured which have network connection and/or communication capabilities. For example, in some automobiles, components not previously considered connective are being manufactured with connective capabilities. Parts, such as brakes, throttle, and/or various other parts, may be manufactured as Ethernet Audio-Video Bridging ("Ethernet AVB") enabled devices which may communicate through an Ethernet AVB network. In some systems, Ethernet networks may be used to connected one or more devices, with audio and/or video data streams being sent wireless and/or through a wireline, such as an Ethernet cable.

With an increasing number of devices being manufactured with network communication capabilities and included in growing networks, a greater amount of data, stream advertisements, and/or data streams are being sent, transmitted, received, and/or otherwise communicated through the network. For example, in some networks, such as Ethernet AVB networks, hundreds or thousands of streams of data may be available on the network. In many of these network systems, each device connected with the network may be receiving and storing information and/or data about all of the data or data streams sent through the network. Tracking all of those streams may require memory resources and processing power. This may not be an efficient use of memory, processing power, and/or other resources of the devices, such as where a device is receiving data, stream advertisements, and/or data streams that the device is not interested in. In some devices, it may be desirable to have a component or feature which may act as a filter, sending on data or stream advertisements of relevance to the upper layers of a device.

A number of systems and methods (generally referred to as "systems") which may be useful in addressing these issues are described. These systems may incorporate a stream reservation protocol sparse mode. In sparse mode, a device may configure its stream reservation protocol listener to only process those streams that are of interest to the device. Streams and/or stream advertisements for streams that do not match the streams specified via a sparse mode may be considered uninteresting and simply ignored.

Figure 1:
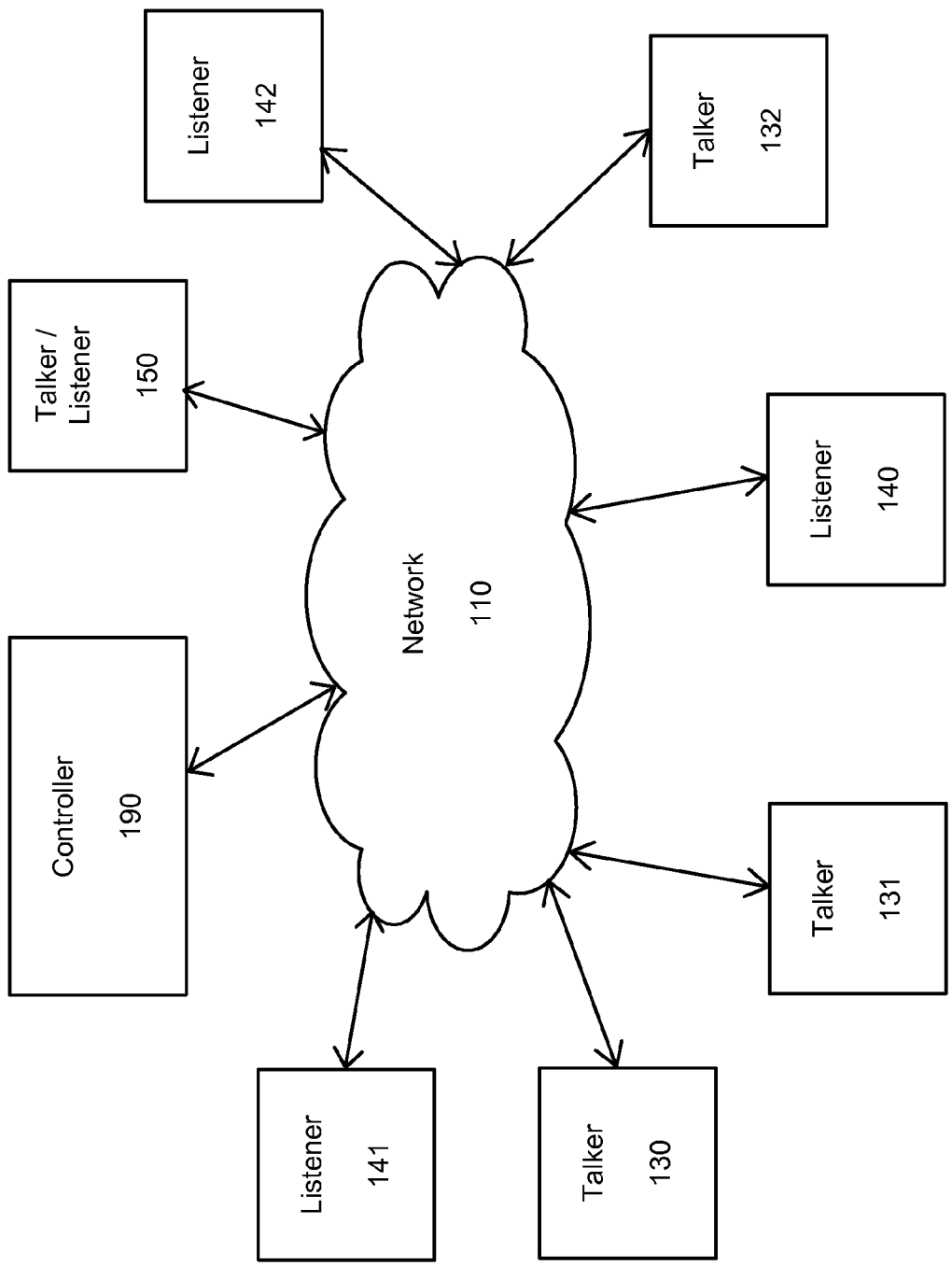
FIG. 1 is a block diagram of an example network communication system.

FIG. 1 illustrates an example of a network communication system which may incorporate, include, and/or use a system and method for sparse mode operation. The system may include one or more networks 110, one or more talkers 130, 131, and 132, one or more listeners 140, 141, and 142, one or more talker/listeners 150, and/or one or more controllers 190. The talkers 130, 131, and 132 may be configured to transmit information and/or data across a network 110. The listeners 140, 141, and 142 may be configured to receive information and/or data across a network 110. The talker/listeners 150 may be configured to transmit and receive information and/or data across a network. The controller 190 may be configured to control one or more aspects of a network 110, talkers 130, 131, and 132, listeners 140, 141, and 142, and/or talker/listeners 150. One or more of the talkers 130, 131, and 132, the listeners 140, 141, and 142, the talker/listeners 150, and/or the controllers 190 may be or may include hardware, software, and/or a combination of hardware and software to implement part or all of the functionality of the system described later. More or less components may be included in other examples.

One or more of the talkers 130, 131, and 132, the listeners 140, 141, and 142, the talkers/listeners 150, and/or the controllers 190 may be connected to each other through or using the network 110. Alternatively or additionally, one or more of the talkers 130, 131, and 132, the listeners 140, 141, and 142, the talkers/listeners 150, and/or the controllers 190 may be connected to each other directly. For example, one or more of the talkers 130, 131, and 132, the listeners 140, 141, and 142, the talkers/listeners 150, and/or the controllers 190 may be connected to each other using a wireline such as an Ethernet cable, and/or a wireless network. Various other connections are possible.

The network 110 may be, include, and/or communicate through or with an Ethernet AVB network. The network 110 may include one or more bridges which may communicate with one or more devices communicating through and/or connected with the network. The one or more bridges may communicate with the network 110 and/or devices connected to the network through or using various protocols, such as Ethernet AVB protocols designated by the IEEE. For example, one or more bridges may communicate with the network 110 and/or devices connected to the network through or using Ethernet AVB protocols such as IEEE 802.1AS-2001 (gPTP) for network timing and synchronization, IEEE 802.1Qav-2009 for queuing and forwarding streaming data, IEEE 802.1Qat-2010 (SRP) for reserving data stream bandwidth in a network, and/or IEEE 1722-2011 related to a possible data streaming format. Various other protocols may be used. Alternatively or additionally, the network 110 may be, include, and/or communicate through or with wide area networks (WAN), such as the Internet, local area networks (LAN), campus area networks, metropolitan area networks, or any other wireless and/or wireline networks that may allow for data communication. The network 110 may be divided into sub-networks. The sub-networks may allow access to all of the components connected to the network 110, or the sub-networks may restrict access between the components connected to the network 110. The network 110 may be regarded as a public or private network and may include, for example, a virtual private network, an encryption, or any other security mechanism employed over the public Internet, or the like. Various other types of networks 110 are possible.

One or more of the talkers 130, 131, and 132, the listeners 140, 141, and 142, and/or the talker/listener 150 may be connected to the network 110 in any configuration that supports data transfer. This may include a data connection to the network 110 that may be wired or wireless. One or more of the talkers 130, 131, and 132, the listeners 140, 141, and 142, and/or the talker/listeners 150 may be connected to an Ethernet AVB network and/or to each other through or with an Ethernet connection, such as using a cable or wireless connection to an Ethernet AVB network. Various other connections may be possible.

The system may include one or more talker systems, or talkers 130, 131, and 132. In small communication networks, the system may have only a small number of talkers, such as twenty or less. In other larger communication systems, the system may include hundreds, thousands, or potentially millions of talkers. Various numbers of talkers are possible.

The talkers 130, 131, and 132 may or may not be or include a portion or all of the features of a computer system, such as a computer system 1000 shown in FIG. 10 and described later. The talkers 130, 131, and 132 may be Ethernet AVB enabled and/or compatible. The talkers 130, 131, and 132 may be configured, adapted, operable, and/or enabled to communicate through and/or with an Ethernet AVB network, such as according to, through, and/or using a one or more standards or protocols. An example of a protocol associated with communications between a talker 130 and a network 110 may be the stream reservation protocol specified in IEEE 802.1Qat-2010. Alternatively or additionally, various other protocols, such as a Multiple MAC Registration Protocol ("MMRP"), IEEE 802.1AS-2011 (gPTP), IEEE 802.1Qav-2009, and/or IEEE 1722-2011 may be used.

The talkers 130, 131, and 132 may be configured, adapted, operable, and/or enabled to send information and/or data through the network 110. For example, talkers 130, 131, and 132 may be configured and/or adapted to send a stream of information that includes data, commands, and/or command signals through, using, or across an Ethernet AVB network. Information and/or data sent by talkers 130, 131, and 132 through the network 110, such as through an Ethernet AVB network, may be received by other devices connected with the network 110, such as listeners 140, 141, and 142 and/or talker/listeners 150.

The talkers 130, 131, and 132 may perform various functions and/or be connected with or include various components. For example, a talker 130 may be connected with the network 110 and an input device, such as a musical instrument or microphone. Information and/or data may be sent to, received by, and/or otherwise input to the talker 130 or a device connected with the talker 130. For example, a user may play an instrument or sing into a microphone connected with the talker 130, and information and/or data about the instrument, singing, and/or voice may be received by the talker 130.

While the talkers 130, 131, and 132 in the network communication system may be, and may be described as, the physical devices themselves (such as a microphone), it should be appreciated that in some systems, the talker may be or may include a computer or other electronic controlling device, which may be used and/or operate to control the talker (such as a microphone), such as some or all of the features of a computer system 1000 shown in FIG. 10 and described later. In these systems, the computer or other electronic controller device may be AVB enabled and/or communicate directly with the network 110. In addition, the computer or other electronic controller device may communicate in various ways with the physical or other device, such as with a wired or wireless connection. Various other alternatives are possible.

The talker 130 may process the information and/or data received in various ways. For example, the talker 130 may transform any signal received, such as the musical signal, from an analog signal to a digital signal. In other systems, a computing device may perform processing of received information and/or data, and may send the processed information and/or data to the talker 130. Various other processing functions may be performed by the talker 130 and/or devices in communication with the talker 130.

The talker 130 may transmit, send, output, and/or advertise ("advertise") processed information and/or data to the network 110, such as in, with, and/or using a data stream and/or Ethernet AVB signal. Such signals may, for example, be referred to as stream advertisements. For example, the talker 130 may produce a stream advertisement that may advertise a data stream encompassing data related to music played by a user on a device connected with the talker 130 onto an Ethernet AVB network. The information and/or data advertised by the talker 130 on the network 110 in the stream advertisement may be received by other devices, such as by various listeners 140, 141, and 142 and/or talker/listeners 150. Various other functions may be performed by the talker 130.

Each talker 130, 131, and 132 may have one or more talker attributes. Talker attributes may specify, include and/or otherwise identify characteristics about the talker 130 and/or a data stream advertised by a talker 130. For example, a talker attribute may describe a data stream, such as an audio, video, and/or command data stream, that the talker 130 will multicast over the network 110. A talker attribute may specify how much bandwidth a data stream advertised by a talker 130 may require in order to be received by a device over the network 110. A talker attribute may specify how long it may take information and/or data sent from the talker 130 to reach a listener 140, which may be referred to as a latency or latency period. A talker attribute may specify what listeners may be interested in the information and/or data advertised by the talker 130, such as by or using a unique identification number or set of characters related to each listener. A talker attribute may specify a unique stream identifier ("ID") for the talker 130 and/or the stream advertised by the talker 130. A talker attribute may specify, include, and/or identify various other pieces of information and/or data. One talker attribute may include multiple pieces of information and/or data, such as information about a bandwidth required for download and a unique stream ID of the talker. In some systems, each talker attribute may be related to only one piece of information and/or data, and each talker 130, 131, and 132 may have multiple talker attributes. In other systems, each talker 130, 131, and 132 has only one talker attribute which specifies multiple pieces of information and/or data about the talkers. Various combinations are possible.

As mentioned, a talker attribute may specify a stream ID for the talker 130. The stream ID of the talker 130 may be a unique sequence of characters and/or numbers which may only be assigned to one talker 130. In some systems, no two talkers may have the same stream ID. An identification of a unique stream ID of a talker 130 may then be used by devices and/or networks to positively identify a source of information and/or data. For example, a device may receive over an Ethernet AVB network a stream advertisement for a data stream that includes a unique stream ID and may, based on an identification of the unique stream ID, determine the talker that has advertised the data stream. Various other uses of the stream ID are possible. The unique stream ID may be a 64 bit stream ID, or various other stream IDs may be used. The talker 130 may be assigned a unique stream ID at the time the talker 130 is manufactured, such as by a manufacturer, after manufacture, such as by being generated by the talker 130 itself, when the talker 130 connects with the network 110, such as by a controller 190, and/or at various other times.

One or more talker attributes may be stored in one or more of talkers 130, 131, and 132, listeners 140, 141, and 142, talker/listener 150, and/or controllers 190. For example, a unique stream ID of a talker 130 may be sent to and/or received by a controller 190, which may record and/or store the unique stream ID of the talker 130 and/or forward the unique stream ID of the talker 130 to one or more listeners 140, 141, and 142, such as through, with, or using a non-SRP protocol.

A stream advertisement may be a signal and/or other transmission from a talker 130, 131, or 132 which may be passed through the network 110. A stream advertisement sent by a talker 130 may indicate that the talker 130 has a data stream that it can and/or will send, multicast and/or otherwise transmit over a network 110. The stream advertisement may include details about the data stream, such as one or more talker attributes that may be sent with and/or included in a stream advertisement advertised and/or output by the talker 130. For example, the stream advertisement may include a unique stream ID of the data stream being advertised by the talker 130 using the stream advertisement. The stream advertisement sent by a talker 130 may be transmitted across a network 110 to and/or received by one or more devices in communication with the network 110. In some systems, the stream advertisement is sent to all devices on a network 110.

One or more listeners 140, 141, and 142, and/or talker/listeners 150 may receive the stream advertisements from the talker. If the listener wishes to receive the data stream being advertised by the stream advertisement, the listener may send a "Listener Ready" signal to a bridge, the network 110 and/or talker. The signal may be a request to attach to the data stream via the stream ID included in the stream advertisement. When an Ethernet AVB bridge receives the "Listener Ready" signal from the listener, the bridge will match it with the talker advertise and allow the data stream referenced by the stream advertisement to be sent to the requesting listener. One or more than one listener may request and/or attach to the same data stream via one stream ID. One listener may request and/or attach to more than one data stream via the stream IDs of each requested data stream. Other variations are possible.

One or more stream advertisements may be sent and/or accessed individually and/or alone with, through, and/or using the network 110. One or more stream advertisements may be sent to, accessed by, and/or received by one or more receiving devices on the network 110, such as listeners 140, 141, and 142, talker/listeners 150, and/or controllers 190. Various other uses and functions of stream advertisements and/or talker attributes are possible.

The system may include one or more listener systems, or listeners 140, 141, and 142. In small networks, the system may have only a small number of listeners, such as twenty or less. In other larger communication systems, the system may have hundreds, thousands, or potentially millions of listeners. Various numbers of listeners are possible.

The listeners 140, 141, and 142 may or may not be or include a portion or all of the features of a computer system, such as a computer system 1000 shown in FIG. 10 and described later. The listeners 140, 141, and 142 may be Ethernet AVB enabled and/or compatible. The listeners 140, 141, and 142 may be configured, adapted, operable, and/or enabled to communicate through and/or with an Ethernet AVB network, such as according to, through, and/or using a one or more standards or protocols, such as the stream reservation protocol identified in IEEE 802.1AS-2011 (gPTP), IEEE 802.1Qav-2009, IEEE 802.1Qat-2010 (SRP), and/or IEEE 1722-2011. Alternatively, various other protocols, such as a MMRP, may be used.

Listeners 140, 141, and 142 may be configured, adapted, and/or operable to receive information that includes data across, through, and/or using the network 110. For example a listener 140 may be configured and/or adapted to receive a stream advertisement and/or a data stream passing across a network 110, such as an Ethernet AVB network. The information and/or data received by a listener 140, 141, and 142 may be, for example, the information and/or data sent by the talker 130, 131, and 132, information and/or data sent by a controller 190, and/or various other information and/or data sent through and/or using the network 110. In some systems, the listeners 140, 141, and 142 may receive one or more stream advertisements advertising a data stream from a talker 130. The listeners 140, 141, and/or 142 may register for and/or receive a data stream being advertised by the stream advertisement from the talker 130. Registration for and/or receipt of a data stream may or may be received by the listeners 140, 141, and 142 with a guaranteed bandwidth. Various other possibilities exist.

Listeners 140, 141, and 142 may perform various other functions and/or include or be connected with various other components. For example, a listener 140 may be connected with a network 110 and an output device, such as a speaker or television monitor. Information and/or data may be gathered and/or otherwise received by the listener 140 through the network 110. For example, information and/or data about notes played on a musical instrument may be transmitted through the network 110 by the talker 130, and may be received by the listener 140. The listener 140 may process the information and/or data received through the network 110. The listener 140 may output processed information and/or data to the speaker. For example, the listener 140 may output information and/or data related to the signal received through the Ethernet AVB network to the speaker.

While the listeners 140, 141, and 142 in the network communication system may be, and may be described as, physical devices themselves (such as a speaker), it should be appreciated that in some systems, the listener may be or may include a computer or other electronic controlling device which may be used and/or operate to control the listener (such as a speaker), such as some or all of the features of a computer system 1000 shown in FIG. 10 and described later. In these systems, the computer or other electronic controller device may be AVB enabled and/or communicate directly with the network 110. In these systems, the computer or other electronic controller device may communicate in various ways with the physical or other device, such as with a standard wired or wireless connection. Various other alternatives are possible.

Each listener 140, 141, and 142 may have one or more listener attributes. A listener attribute may be, for example, a Listener Ready, a Listener Asking Failed, and/or a Listener Ready Failed attribute. These attributes may or may not contain a single piece of information, such as a stream ID that the listener may want to attach to.

One or more listener attributes may be sent with, through, and/or using the network 110. One or more listener attributes may be sent to, accessed by, and/or received by one or more receiving devices on the network 110, such as talkers 130, 131, and 132, talker/listeners 150, and/or controllers 190. One or more listener attributes may be stored in one or more of talkers 130, 131, and 132, listeners 140, 141, and 142, talker/listeners 150, and/or controllers 190. One or more listener attributes may be used to connect a listener with a data stream and/or talker. Various other uses and functions of listener attributes are possible.

Each listener 140, 141, and 142 may additionally or alternatively have one or more listener characteristics which may specify, include, and/or otherwise identify characteristics about the listener 140. Listener characteristics may, for example, exist and/or be used outside of the stream reservation protocol stack 230, and/or may be used to inform devices on a network about the characteristics and/or capabilities of a listener. For example, a listener characteristic may specify what talkers a listener 140 may be interested in. A listener characteristic may specify a unique listener ID for the listener 140, which may, for example, uniquely identify the listener 140 to other devices on the network 110. A listener characteristic may identify one or more capabilities of the listener 140, such as a bandwidth that the listener 140 has available, a type of data stream a listener 140 may be interested in and/or capable of processing, and/or various other capabilities of the listener 140. A listener characteristic may additionally or alternatively specify various other pieces of information and/or data about the listener 140. One listener characteristic may include multiple pieces of information and/or data. In some systems, each listener characteristic may be related to only one piece of information and/or data, and each listener 140, 141, and 142 may have multiple listener characteristics. In other systems, each listener 140, 141, and 142 has only one listener characteristic which specifies multiple pieces of information and/or data about the listeners. Various combinations are possible.

Talker/listeners 150 may be configured, adapted, operable, and/or enabled to send and receive information and/or data through the network 110. A talker/listener 150 may thus include the capabilities and functions of a talker 130 and a listener 140. In some systems, all devices connected with the network 110 may be talker/listeners 150. In other systems, some or none of the devices connected with the network 110 may be talker/listeners 150. While the following discussion may only refer to talkers 130 and listeners 140 individually, it should be appreciated that in some systems, functions and attributes of talkers 130, 131, and 132 and/or listeners 140, 141, and 142 discussed may be accomplished by talker/listeners 150. Various combinations are possible.

The system may include one or more controller 190. The controller 190 may or may not be or include a portion or all of the features of a computer system, such as a computer system

1000 shown in FIG. 10 and described later. The controller 190 may be Ethernet AVB enabled and/or compatible. The controller 190 may be configured, adapted, operable, and/or enabled to communicate with and/or through an Ethernet AVB network, such as according to, through, and/or with a one or more standards or protocols, such as the stream reservation protocol outlined in IEEE 802.1AS-2011 (gPTP), IEEE 802.1Qav-2009, IEEE 802.1Qat-2010 (SRP), and/or IEEE 1722-2011. Alternatively, various other protocols, such as a MMRP, may be used.

The controller 190 may identify the talkers 130, 131, and 132 and listeners 140, 141, and 142 in and/or communicating using the network 110, such as the talkers and listeners in and/or communicating using an Ethernet AVB network. The controller 190 may communicate directly or indirectly with talkers 130, 131, and 132 and listeners 140, 141, and 142. The controller 190 may receive and communicate information to, from, or between the talkers 130, 131, and 132 and listeners 140, 141, and 142. For example, a controller 190 may retrieve or assign a unique stream ID or other talker attribute to a talker 130, and/or may pass the unique stream ID of the talker and/or other talker attribute to a listener 140. Various other communications and interactions with talkers 130, 131, and 132 and listeners 140, 141, and 142 are possible.

Figure 2:
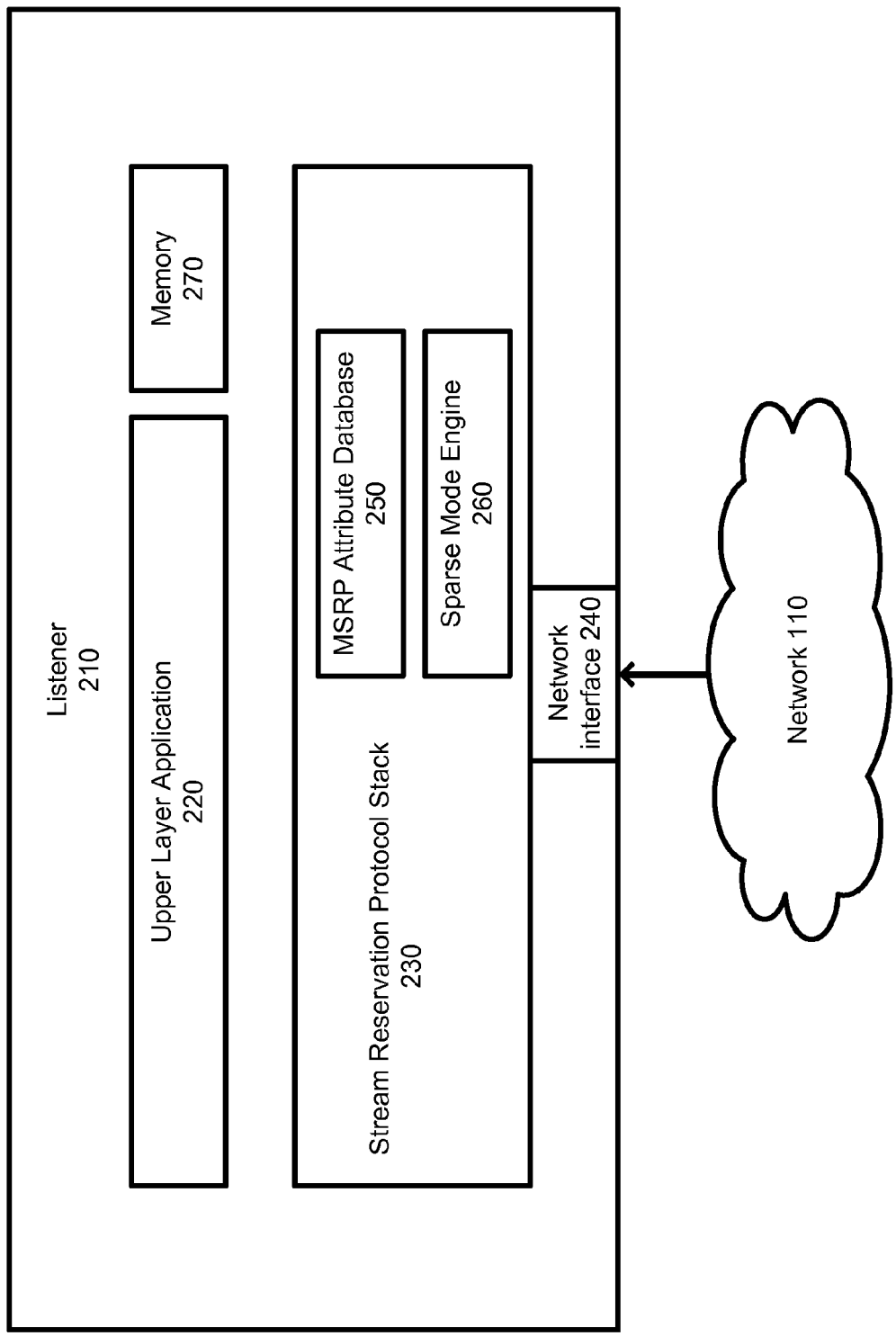
FIG. 2 is a block diagram of an example listener in a network communication system.

FIG. 2 is a block diagram of an example listener 210, which may be similar to and/or resemble one or more of the listeners 140, 141, and 142 in FIG. 1. Features in the listener 210 may be found in one or more of the listeners 140, 141, and 142, and vice versa.

The listener 210 may include a processor, a field programmable gate array ("FPGA"), hardware modules, software modules, combinations of hardware and software modules, memory, stacks, layers, and/or other various other components and/or features. The listener 210 may include one or more of an upper layer application 220, a stream reservation protocol module, or stream reservation protocol stack 230, a network interface 240, and/or memory 270. The stream reservation protocol stack 230 may further include a multiple stream registration protocol ("MSRP") attribute database 250 and/or a sparse mode engine 260. The listener 210 may or may not be modeled after and/or include features of an open systems interconnection model (OSI model). In another example, the listener 210 may include more than one device, such that one or more of the modules or components of the listener 210 may be located in different devices. For example, one device may include a sparse mode engine 260 while a second device may include the upper layer application 220 of the listener 210. Other variations are possible.

The upper layer application 220 may be, may include, and/or may be referred to as an upper layer module, an upper layer application module, an upper layer, and/or a stack. The upper layer application 220 may include software, hardware or some combination thereof executable by a processor. The upper layer application 220 of a listener 210 may perform one or more administrative tasks for a listener 210, and/or may coordinate and/or orchestrate one or more components of a listener 210 to ensure that the listener 210 performs tasks for which the listener 210 may be implemented. The upper layer application 220 may, for example, identify, receive, acquire, and/or learn about data streams which may be advertised and/or transmitted over a network 110.

The upper layer application 220 may store information related to all stream advertisements and/or data streams received by the upper layer application 220 from the stream reservation protocol stack 230, and/or may send those data streams which may be relevant to the listener 210 to components connected with the listener 210. For example, the upper layer application 220 may communicate with and/or include memory and/or a database, which the upper layer application may use to store information related to all stream advertisements and/or data streams received. The memory and/or database accessible and utilized by the upper layer application 220 may be a part of the upper layer application 220, or may be a separate component of the listener 210, such as memory 270 described later. The memory 270 may include and/or store instructions for operation and/or functions to be performed by the upper layer application 220. Various other examples are possible.

The upper layer application 220 may ensure that a data stream sent to listener 210 can be communicated to other components attached to the listener 210. For example, where the listener 210 is connected with or represents an speaker, the upper layer application 220 may identify from all data streams received from the stream reservation protocol stack 230 those data streams which include information and/or data about audio signals to be output by the speaker, and may process and/or transmit this information to the speaker for broadcast and/or audio transmission. Various other examples are possible.

The upper layer application 220 may additionally or alternatively be capable of configuring a processor in or connected with the listener 210. For example, where the listener 210 is an amplifier, an upper layer application 220 of the listener 210 may configure the digital signal processor of the listener 210 for balance, volume, bass, and/or treble. The upper layer application 220 may communicate with a controller 190 in the network communication system. For example, the controller 190 may send a list of one or more unique stream IDs of talkers that may advertise data streams that the listener 210 may be interested in acquiring. The controller 190 may determine what capabilities the listener may have for one or more data streams based on the capabilities sent by the listener 210, and may send stream IDs of data streams for the listener 210 to register for. The upper layer application 220 may also or alternatively be used to initiate a "Listener Ready" attach request when a corresponding stream advertisement from a talker is received. In other systems this may not be included, such as in a system where a particular Listener device may be "hard-coded" to always initiate an attachment request for a particular stream ID whether it has received a stream advertisement. Various other functions of the upper layer application are possible.

The listener 210 may include a stream reservation protocol stack 230. The stream reservation protocol stack 230 may identify, specify, represent and/or include a protocol for the listener 210. For example, the stream reservation protocol stack 230 may be or represent the stream reservation protocol identified and described in the IEEE 802.1Q, such as in IEEE 802.1Q-2011 clause 35, and/or may be part of the Ethernet AVB protocols. Information and/or data received through the network interface 240, such as a stream advertisement, may be passed to the stream reservation protocol stack 230, which may process the information and/or data. The stream reservation protocol stack 230 may transmit, output, send, and/or pass some or all of the information and/or data received from the network 110, such as the received stream advertisement, to the upper layer application 220 to be processed, implemented, and/or transmitted. In some systems, the stream reservation protocol stack 230 may only process, analyze, and/or be involved with stream advertisements.

In some systems, the stream reservation protocol stack 230 may transmit, handle, and/or process the abandonment of a stream advertisement from a talker which may occur when a talker device crashes or stops streaming data. In some systems, the stream reservation protocol stack 230 may use MVRP as well as MSRP. MVRP may allow a listener 140 to attach to a same VLAN as a talker 130. Other functions of the stream reservation protocol stack 230 are possible.

The stream reservation protocol stack 230 may be, may include, and/or may be referred to as a stream reservation protocol module, a stream reservation protocol layer module, a stream reservation protocol, a stream reservation protocol application, and/or a stream reservation protocol layer. The stream reservation protocol stack 230 may include software, hardware or some combination thereof executable by a processor. The stream reservation protocol stack 230 may communicate with and/or include memory and/or a database, which the stream reservation protocol stack 230 may use to store information and/or data, such as information about stream advertisements received. The memory and/or database accessible and utilized by the stream reservation protocol stack 230 may be a part of the stream reservation protocol stack 230, or may be a separate component of the listener 210, such as memory 270 described later. The memory 270 may include and/or store instructions for operation and/or functions to be performed by the stream reservation protocol stack 230. Various other examples are possible.

The listener 210 may include a network interface 240. The network interface 240 may be an interface between one or more components and/or features of the listener 210 and the network 110. The network interface 240 may receive information and/or data from the network 110 and/or may pass the received information and/or data to the stream reservation protocol stack 230 of the listener 210. In some systems, the network interface 240 may transmit information from the stream reservation protocol stack 230 of the listener 210 to the network 110.

The listener 210 may include memory 270. Memory 270 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 270 may include a cache or random access memory for a processor, such as processor 1002 of computer system 1000 described later. In alternative examples, the memory 270 is separate from a processor, such as a cache memory of a processor, the system memory, or other memory. The memory 270 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 270 may be operable to store instructions executable by a processor. The functions, acts or tasks illustrated in the figures or described may be performed by a programmed processor executing the instructions stored in the memory 270. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like. Memory 270 may be accessible and/or in communication with one or more modules of the listener 210, such as the upper layer application 220, the stream reservation protocol stack 230, the MSRP attribute database 250, and/or the sparse mode engine 260. Additionally or alternatively, one or more of the modules of the listener 210, such as the upper layer application 220, the stream reservation protocol stack 230, the MSRP attribute database 250, and/or the sparse mode engine 260, may have internal and/or memory specific to the module, which may resemble or be similar to memory 270.

The stream reservation protocol stack 230 of the listener 210 may include, be connected with, and/or be in communication with an MSRP attribute database 250. The MSRP attribute database 250 may represent a memory, which may resemble and/or be similar to memory 270, a data storage bank, and/or various other components. The MSRP attribute database 250 may or may not be or include one or more features of a computer system, such as a computer system 1000 shown in FIG. 10 and described later. The MSRP attribute database 250 may have an application programming interface ("API") which may be designed to notify an upper layer application whenever a new attribute, such as a talker attribute and/or talker stream ID, is registered on the network 110 and/or received by the stream reservation protocol stack 230.

As mentioned, one or more of talkers 130, 131, and 132 may have talker attributes, and/or one or more of the listeners 140, 141, and 142 may have listener attributes. The MSRP attribute database 250 may represent a database including and/or storing one or more talker attributes and/or listener attributes for talkers 130, 131, and 132 and/or listeners 140, 141, and 142 on the network 110. For example, the MSRP attribute database 250 may include attributes for all talkers 130, 131, and 132 and/or listeners 140, 141, and 142 on or connected with a network 110 such as an Ethernet AVB network. For each talker and/or listener tracked or included in the MSRP attribute database 250, the MSRP attribute database 250 may store or identify where the talker and/or listener is, how much bandwidth a data stream from the talker may require, how much bandwidth may be available for a listener, a unique stream ID for the talker and/or listener, and/or various other pieces of information and/or data. The MSRP attribute database 250 may, for example, store information and/or data indicating that a talker 130 with a first unique stream ID is connected with an Ethernet AVB network, identifying what information and/or data to request from the network 110 and/or controller 190 to obtain and/or register for the data stream from the talker 130, and what percentage of an Ethernet connection will be used if a listener 140 has registered for, and/or begins receiving, the data stream from the talker 130. Information and/or data received by the MSRP attribute database 250, such as one or more stream advertisements from the network 110, may be transmitted, output, sent, and/or passed from the stream reservation protocol stack 230 to the upper layer application 220.

In some systems, the MSRP attribute database 250 in each talker 130, 131, and 132 and/or listener 140, 141, and 142 may be created and/or updated from a separate and/or collective MSRP attribute database. This separate and/or collective MSRP attribute database may represent one database for multiple or all talkers 130, 131, and 132 and/or listeners 140, 141, and 142 on a network 110. For example, a separate and/or collective MSRP attribute database may be attached and/or in communication with the network 110, and/or may store information and/or data about one or more talkers 130, 131, and 132 and/or listeners 140, 141, and 142. Each talker 130, 131, and 132 and/or listener 140, 141, and 142 may include a MSRP attribute database 250, and/or may have access to the separate and/or collective MSRP attribute database.

The MSRP attribute database 250 of each talker 130, 131, and 132 and/or listener 140, 141, and 142 may be a copy of, and/or include information from, the separate and/or collective MSRP attribute database. In such systems, the separate and/or collective MSRP attribute database may be continuously updated, or updated at various other intervals. In some systems, the separate and/or collective MSRP attribute database may collect and/or update information based on information and/or data about stream advertisements and/or data streams received and/or stored in each of the MSRP attribute databases 250 of each of the talkers 130, 131, and 132 and/or the listeners 140, 141, and 142. Updates may be sent by the separate and/or collective MSRP attribute database to the MSRP attribute database 250 in each individual talker 130, 131, and 132 and/or listener 140, 141, and 142 at various intervals, such as every 10-15 seconds or so. In these systems, the MSRP attribute database 250 of each of the talkers 130, 131, and 132 and/or listeners 140, 141, and 142 may be the same.

In an alternative example, the MSRP attribute database 250 may not be on any of the talkers 130, 131, and 132 or listeners 140, 141, and 142 at all, but may exist separately and/or be in communication with one or more of the talkers and listeners. In another alternative example, parts of a separate and/or collective MSRP attribute database may be extracted from an external database and stored in volatile memory in a talker 130, 131, and 132 or a listener 140, 141, and 142 when the talker or listener is powered up. Various other examples, functions and/or features of an MSRP attribute database 250 are possible.

The stream reservation protocol stack 230 may also include a sparse mode engine 260. The sparse mode engine 260 may be configured, adapted, operable, and/or used during an operation of the listener 210 in a sparse mode or in a full mode. The sparse mode engine 260 may be in communication with, connected with, and/or otherwise enabled to send and/or receive data to and/or from the upper layer application 220, the MSRP attribute database 250, and/or the network interface 240. The sparse mode engine may be an additional and/or modified hardware component of the listener system or listener 210, may be encoded in software and/or stored in memory of the listener 210, and/or may be a combination of hardware and/or software. Various other combinations are possible.

The sparse mode engine 260 may be, may include, and/or may be referred to as a sparse mode module, a sparse mode layer, a sparse mode application, and/or a sparse mode stack. The sparse mode engine 260 may include a processor, software, hardware or some combination thereof executable by a processor. The sparse mode engine 260 may communicate with and/or include memory and/or a database. The memory and/or database accessible and utilized by the sparse mode engine 260 may be a part of the sparse mode engine 260, or may be a separate component of the listener 210, such as memory 270 described later. The memory 270 may include and/or store instructions for operation and/or functions to be performed by the sparse mode engine 260. Various other examples are possible.

The sparse mode engine 260 may perform various functions. The sparse mode engine 260 may receive one or more stream advertisements advertised and/or sent over the network 110. In some systems, the sparse mode engine 260 may register for data streams advertised and/or sent over a network 110. Stream advertisements may be received directly from the network 110, from the network interface 240, and/or in various other ways. The sparse mode engine 260 may receive, identify, and/or store one or more stream advertisements that may be of interest to, or otherwise requested by, the upper layer application 220 and/or the listener 210. The sparse mode engine 260 may transmit, output, send, and/or pass one or more received stream advertisements from the network 110 to the MSRP attribute database 250 and/or to the upper layer application 220 of the listener 210. For example, when a listener 210 is operating in a full mode, the sparse mode engine 260 may pass most or all received stream advertisements to the MSRP attribute database 250 and/or the upper layer application 220. In a full mode, the sparse mode engine 260 may be disabled and/or may function as a pass-through, and/or may not perform other functions such as comparison and/or filtering functions.

In another mode, such as when the listener 210 is operating in a sparse mode, the sparse mode engine 260 may be configured, adapted, capable, and/or operable to identify one or more stream advertisements which may be of interest to the listener 210. The sparse mode engine 260 may receive one or more specified stream IDs from the upper layer application 220, which may identify and/or be related to one or more data streams or talkers that may advertise through or over the network 210. These specified stream IDs may represent data streams that the listener 210 is interested in. The upper layer application 220 may send the information and/or data about data or data streams of interest to the listener 210 and/or upper layer application 220 through a query, a signal, a list, and/or a stream ID query.

In the sparse mode, the sparse mode engine 260 may receive, identify, and/or determine one or more stream IDs from each of the stream advertisements that the sparse mode engine 260 may receive from the network 110. For example, as mentioned, the stream IDs of each talker 130 may be attached directly to a stream advertisement advertised by the talker 130 over the network 110, and the sparse mode engine 260 may be configured to extract the stream ID and/or other information from the received stream advertisement. Various other methods of identifying the stream ID are possible.

In the sparse mode, the sparse mode engine 260 may be configured, adapted, operable, and/or used to compare the stream IDs of the one or more advertised data streams and/or stream advertisements received by a listener 210 to the one or more stream IDs specified by the upper layer application 220 and/or the listener 210. When operating in sparse mode, the sparse mode engine 260 may transmit, output, send, and/or pass only those stream advertisements with a stream ID matching at least one of the stream IDs received from the upper layer application 220 and/or of interest to the listener 210 or upper layer application 220 to the MSRP attribute database 250 and/or the upper layer application 220. The sparse mode engine 260 may perform various other features.

Figure 3:
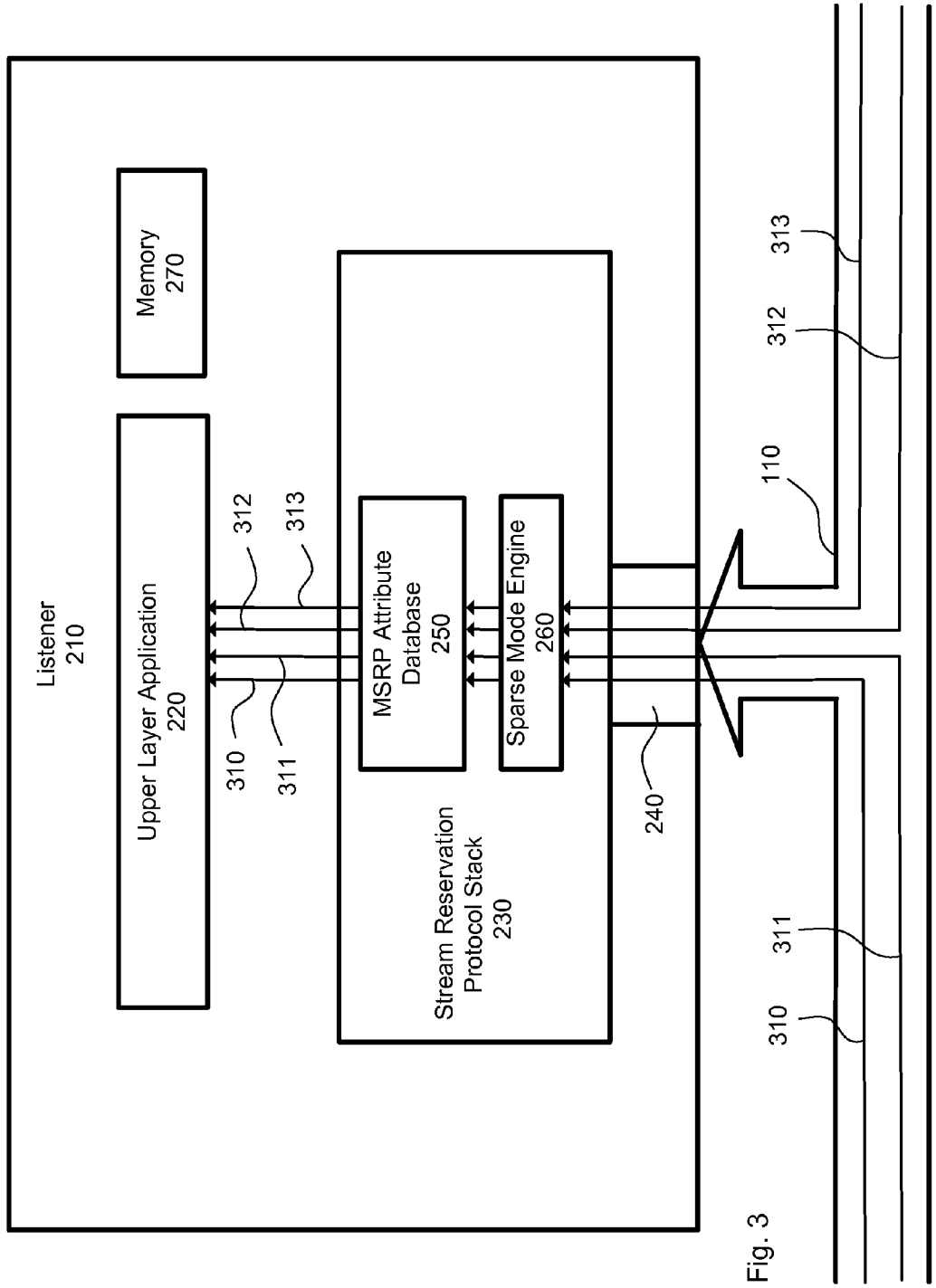
FIG. 3 is a block diagram of an example listener in a network communication system operating in full mode.

The stream reservation protocol stack 230 and/or the listener 210 may operate in at least two modes. For example, FIG. 3 shows an example of the stream reservation protocol stack 230 and/or listener 210 operating in a full mode. In full mode, stream advertisements 310, 311, 312, and 313 may be advertised, transmitted, sent, pass through, and/or otherwise communicated along or through a network 110, such as an Ethernet AVB network. One or more listeners, such as listener 210, may receive and/or identify each of the stream advertisements 310, 311, 312, and 313 advertised. For example, a listener 210 may receive a REGISTER_STREAM.Indication/DEREGISTER_STREAM.Indication for every stream advertisement 310, 311, 312, and 313 that is added to or removed from a network 110.

The stream advertisements 310, 311, 312, and 313 may be received by the listener 210 directly and/or through or using a network interface 240, such as an Ethernet AVB interface. The stream advertisements 310, 311, 312, and 313 advertised on the network 110 may include talker attributes related to a talker 130, 131, and 132 that may have advertised and/or transmitted the stream advertisements 310, 311, 312, and 313. For example, each stream advertisement 310, 311, 312, and 313 may include and/or be related to a unique stream ID of the talker who advertised the stream advertisement. Stream advertisement 310 may relate to and/or have a stream ID of "a," stream advertisement 311 may relate to and/or have a stream ID of "b," stream advertisement 312 may relate to and/or have a stream ID of "c," and/or stream advertisement 313 may relate to and/or have a stream ID of "d." Various other configurations are possible.

The stream advertisements 310, 311, 312, and 313 may be transmitted, output, sent, and/or passed through the sparse mode engine 260, which may be disabled and/or may not affect, alter, process, or otherwise modify the stream advertisements 310, 311, 312, and 313. The stream advertisements 310, 311, 312, and 313 may be transmitted, output, sent, and/or otherwise passed to the MSRP attribute database 250. The MSRP attribute database 250 may or may not record a receipt of the stream advertisements 310, 311, 312, and 313. The MSRP attribute database 250 may or may not process or alter the stream advertisements 310, 311, 312, and 313. The MSRP attribute database 250 may notify and/or pass all of the stream advertisements 310, 311, 312, and 313 received by the stream reservation protocol stack 230 to the upper layer application 220, such as through or using an application programming interface.

In full mode, all stream advertisements 310, 311, 312, and 313 received by the listener 210 may ultimately be sent to the upper layer application 220. The stream reservation protocol stack 230 may send a REGISTER_STREAM.Indication/ DEREGISTER_STREAM.Indication for every stream advertisement 310, 311, 312, and 313 that is added to or removed from a network 110 to the upper layer application 220. In some systems, this may result in a lot of messages being passed between the stream reservation protocol stack 230 and the upper layer application 220.

The upper layer application 220 may store information about all of the stream advertisements 310, 311, 312, and 313 received from the MSRP attribute database 250. In some systems, the upper layer application 220 may only be interested in less than all of the stream advertisements 310, 311, 312, and 313. There may be stream advertisements 310, 311, 312, and 313 that relate to one or more data streams that the upper layer application 220 may not be interested in, desire to receive, care about, be capable or dedicated to processing, and/or otherwise may not be of value to the upper layer application 220. The upper layer application 220 may store information about all of the received stream advertisements 310, 311, 312, and 313, but may, in some systems, only execute functions, take action, and/or process some of the stream advertisements 310, 311, 312, and 313, while ignoring functions and/or stream advertisements 310, 311, 312, and 313 that may relate to data streams that the listener 210 is not programmed to process. The upper layer application 220 may parse through the stream advertisements 310, 311, 312, and 313 to determine stream advertisements and/or data streams advertised that are of interest and/or capable and intended to be processed by the upper layer application 220 from the remainder of the stream advertisements 310, 311, 312, and 313. The upper layer application 220 may not take further action for those stream advertisements 310, 311, 312, and 313 that are not of interest to the upper layer application 220. As such, in some systems, an upper layer application 220 of a listener 210 may receive and store information and/or data about stream advertisements that the listener 210 may not need to store.

Figure 4:
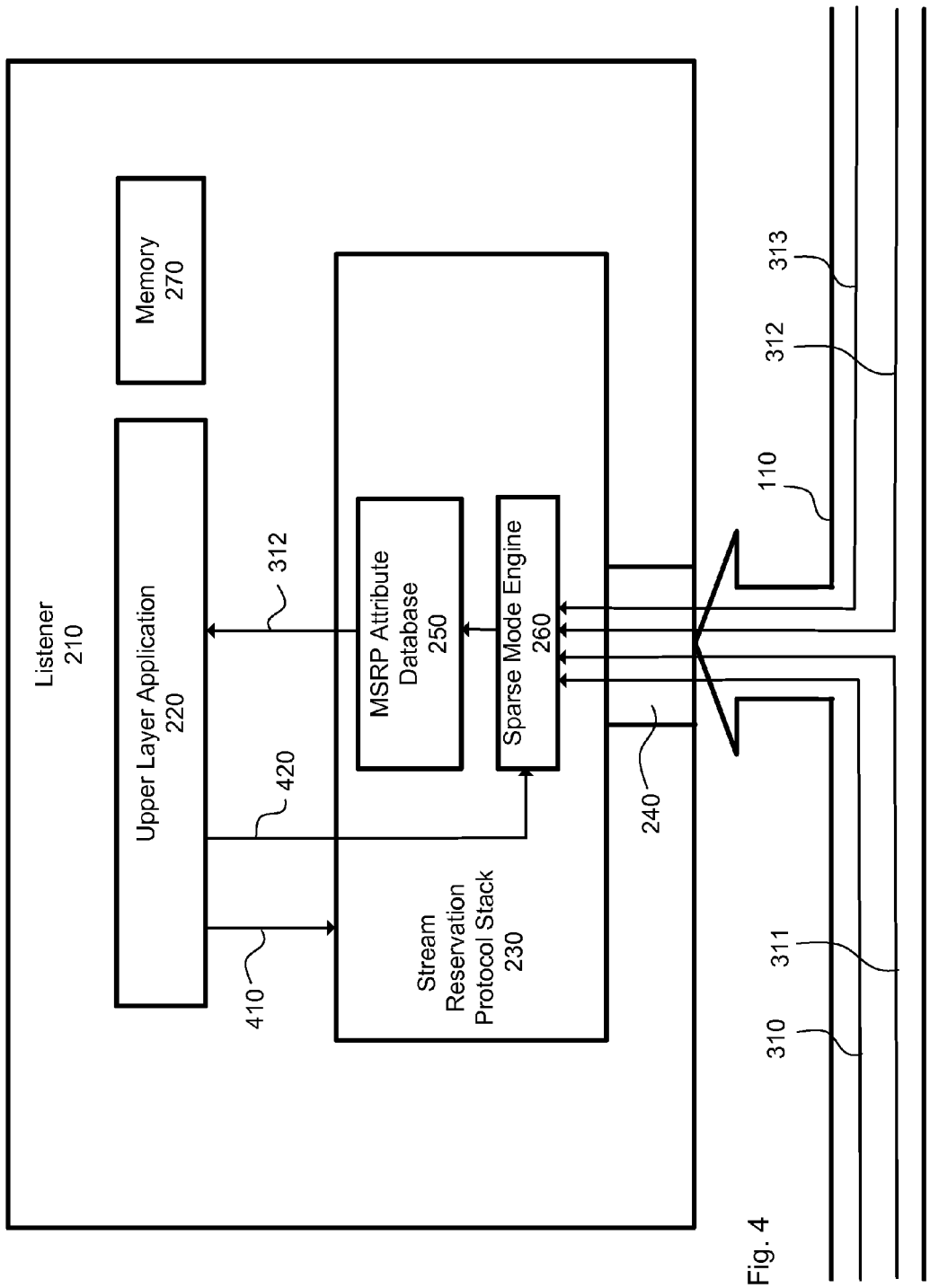
FIG. 4 is a block diagram of an example listener in a network communication system operating in sparse mode.

FIG. 4 shows an example of the stream reservation protocol stack 230 and/or listener 210 operating in a sparse mode. Sparse mode may directly affect a REGISTER_STREAM.Indication, such as an indication detailed in IEEE 802.1Qat clause 35.2.3.1.2, that may occur when a talker registers a new stream on a network. Sparse mode may also or alternatively directly affect a DEREGISTER_STREAM.Indication, such as an indication detailed in IEEE 802.1Qat clause 35.2.3.1.4, that may occur when a talker removes a stream registration. Other variations are possible.

A stream reservation protocol stack 230 and/or listener 210 may be set to operate in either a full mode or a sparse mode. A stream reservation protocol stack 230 and/or listener 210 may switch or alternate between a full mode and a sparse mode in various ways. For example, an upper layer application 220 of the listener 210 may send a mode switch signal 410 to the stream reservation protocol stack 230. In circumstances where the listener 210 is operating in a full mode, the mode switch signal 410 may be, for example, "Mode=Sparse." In circumstances where the stream reservation protocol stack 230 and/or listener 210 is operating in a sparse mode, the mode switch signal 410 may be, for example, "Mode=Full." Various other mode switch signals 410 may be possible, such as where a listener 210 may be configured, adapted, operable, and/or used in different modes.

The mode switch signal 410 received by the stream reservation protocol stack 230 may trigger and/or configure the stream reservation protocol stack 230 to run in the mode specified by the mode switch signal 410. For example, where a mode switch signal 410 specifying "Mode=Sparse" is received, the stream reservation protocol stack 230 may operate in a sparse mode. Alternatively, where a mode switch signal 410 specifying "Mode=Full" is received, the stream reservation protocol stack 230 may operate in a full mode. Various other configurations are possible.

When a sparse mode of operation is desired and/or specified, such as via a mode switch signal 410, the upper layer application 220 may additionally or alternatively send one or more stream IDs to the stream reservation protocol stack 230 and/or the spare mode engine 260. For example, an upper layer application 220 may send a stream ID query 420 to the sparse mode engine 260, identifying one or more stream IDs for which the listener 210 and/or upper layer application 220 may be interested in. For example, the upper layer application 220 may send a stream ID query 420 indicating "SID=c" to the sparse mode engine. This stream ID query 420 of "SID=c" may indicate that the listener 210 is interested in receiving a data stream with the stream ID of "c" if and when a data stream with a stream ID of "c" is identified as being sent through or across the network 110. The stream ID query 420 may also, or alternatively, identify stream IDs that the upper layer application 220 and/or listener 210 may no longer be interested in.

The stream ID query 420 may be or may be in the form of a REGISTER_QUERY query, and/or may be used to inform the stream reservation protocol stack 230 that the upper layer application 220 is interest in the particular stream ID and wishes to be notified, such as via a REGISTER_STREAM.Indication indication, whenever the stream ID is added to or removed from the network. An example of a stream ID query 420 may be:

int REGISTER_QUERY (streamID_t*streamID)

This function may be called to register a stream from a listener's interest list when the listener 210 is in sparse mode. "streamID" may be a pointer to a streamID_t structure, to identify the stream. A "0" may be returned if succeeded, and a "−1" may be returned if failed.

The stream ID query 420 may be or may be in the form of a DEREGISTER_QUERY query, and/or may be used to inform the stream reservation protocol stack 230 that the upper layer application 220 is no longer interest in the particular stream ID and does not wish to be notified about the stream in the future. An example of a stream ID query 420 may be:

```
int DEREGISTER_QUERY (streamID_t*streamID)
```

This function may be called to deregister a stream from a listener's interest list when the listener 210 is in sparse mode. "streamID" may be a pointer to a streamID_t structure, to identify the stream. A "0" may be returned if succeeded, and a "−1" may be returned if failed.

The stream ID query 420 may include more than one stream ID and/or identify more than one data stream. For example, a stream ID query 420 may indicate "SID=T, U, V," indicating the listener 210 is interested in receiving each of the data streams "T," "U," and "V," if and/or when each of these streams are advertised through the network 110. The upper layer application 220 may identify more than one stream ID in a given stream ID query 420. The upper layer application 220 may send more than one stream ID query 420 to the stream reservation protocol stack 230 and/or the sparse mode engine 260. Various other combinations are possible.

The stream ID query 420 may identify and/or specify the stream ID of one or more data streams for which the upper layer application 220 and/or the listener 210 may wish to receive and/or are interested in and/or would like to register to receive. A listener 210 may be interested in various data streams for various reasons. For example, a listener 210 may be interested in a data stream which the listener 210 is capable of, designated for, and/or otherwise required to process and/or further transmit. A listener 210 may additionally or alternatively be interested in a data stream which a controller 190 has told the listener 210 to register for. For example, where the listener 210 is a left speaker, the listener 210 may be interested in information and/or data related to a left audio signal. The speaker may be configured and/or operable to output left audio data streams, and therefore may desire, be configured, and/or be adapted to register for one or more left audio data streams sent through the network 110. In this example, the upper layer application 220 may send a stream ID query 420 to the stream reservation protocol stack 230 and/or the sparse mode engine 260 specifying the stream ID for one or more left audio data streams sent from one or more talkers, such as a microphone talker and/or a guitar talker. While other data streams, such as video or command data streams, may be passed through or on the network 110, the listener 210 may not be capable of processing these video or command data streams. The upper layer application 220 may not send stream IDs related to the video or command data streams, as receiving and storing information and/or data related to the video or command stream advertisements and/or data streams by the speaker listener 210 may be a waste of memory and/or resources for the speaker listener 210.

The stream reservation protocol stack 230 and/or the sparse mode engine 260 may receive the stream ID query 420 identifying the stream IDs of one or more talkers or data streams that the listener 210 is interested in. The stream reservation protocol stack 230 may keep a store and/or keep track of stream IDs identified in stream ID queries 420, and/or stream IDs that have been de-registered for by the upper layer application 220. The sparse mode engine 260 may compare each of the stream advertisements 310, 311, 312, and 313 received over the network 110 to the stream IDs identified in the stream ID query 420 and/or stored by the stream reservation protocol stack 230. When operating in sparse mode, the sparse mode engine 260 may not send any stream advertisements to the MSRP attribute database 250 or the upper layer application 220 that do not include or match the stream IDs specified in the stream ID query 420. The sparse mode engine 260 may only send, forward, or allow to pass through those stream advertisements that are or include a stream ID that matches a stream IDs identified in the stream ID query 420. The sparse mode engine 260 may filter out all stream advertisements that relate to data streams that the listener 210 is not interested in, cannot process, and/or is not capable of further using or interpreting. Various alternatives are possible.

The mode switch signal 410 and the stream ID query 420 may be different signals, with the mode switch signal 410 being sent prior to a stream ID query 420. Multiple stream ID queries 420 may be sent at various times. In other systems, the mode switch signal 410 and the stream ID query 420 may be the same signal and/or may be sent at the same time to the stream reservation protocol stack 230 and/or the sparse mode engine 260. Various combinations are possible.

A stream advertisement, such as stream advertisement 312, may have a stream ID which may match one or more of the stream IDs sent with the stream ID query 420. For example, where the stream ID query 420 specifies a data stream with a stream ID "c," the stream advertisement 312, which has or includes a stream ID "c," may match the stream ID specified in the stream ID query 420. The sparse mode engine 260 may identify and/or determine that the stream advertisement 312 has a matching stream ID with one of the stream IDs sent with the stream ID query 420. For example, the sparse mode engine 260 may identify, determine and/or extract the talker attributes from the stream advertisements 310, 311, 312, and 313. The talker attributes may include the stream ID of the talkers who advertised the stream advertisements 310, 311, 312, and 313. The sparse mode engine 260 may compare the extracted stream IDs with the stream IDs identified in the stream ID query 420, and/or may determine a stream advertisement 312 that may match one or more of the stream IDs from the stream ID query 420.

The matching stream advertisement 312 may be transmitted, output, sent, and/or passed from the sparse mode engine 260 to the MSRP attribute database 250 and/or to the upper layer application 220. Operation of the sparse mode engine 260 when the listener 210 operates in sparse mode may differ from operation of the sparse mode engine 260 when the listener 210 operates in full mode, in that the rest of the stream advertisements 310, 311, and 313 which do not have or match a stream ID from the stream ID query 420 may not be transmitted, output, sent, and/or passed from the sparse mode engine 260 to the MSRP attribute database 250.

The MSRP attribute database 250 may or may not record a receipt of the matching stream advertisement 312. The MSRP attribute database 250 may or may not process or alter the stream advertisement 312. In some systems, the MSRP attribute database 250 may only contain entries for the stream advertisements which match the stream ID query 420, and/or may not contain entries for all of the stream advertisements 310, 311, 312, and 313. The MSRP attribute database 250 may pass the stream advertisement 312 to the upper layer application 220.

The upper layer application 220 may store information about the stream advertisement 312 received from the MSRP attribute database 250. The upper layer application 220 may process and/or transmit the received stream advertisement 312. Other functions are possible.

A stream reservation protocol stack 230 and/or listener 210 may switch back and forth between full mode operation and sparse mode operation in various ways, such as through or using a mode switch signal 410, and/or at the direction of a controller 190. Switching between a full mode and a sparse mode, or between various other modes, may be prompted and/or result from a signal received by the upper layer application 220 and/or the listener 210. For example, the upper layer application 220 may receive a signal from a controller 190 on a network, which may indicate that the listener 210 should send a mode switch signal 410 and/or switch operation to a sparse mode or a full mode. In other systems or circumstances, the upper layer application 220 may send a mode switch signal 410 without prompting or receipt of a signal from the controller 190 or over the network. For example, the upper layer application 220 may identify, determine, and/or recognize that a certain amount of memory, resources, and/or processing power has been or is being used by the listener 210. The upper layer application 220 may, based on this determination, switch an operation from a full mode to a sparse mode. In this example, the upper layer application 220 may, for example, query the controller 190 and/or network 110 for talker attributes and/or stream IDs of interest to and/or processed by the listener 210, or may identify these talker attributes and/or stream IDs in another way. The upper layer application 220 may then forward the talker attributes and/or stream IDs to the stream reservation protocol stack and/or sparse mode engine 260. Various other configurations and methods are possible.

The network communication system may include one or more devices which may be Ethernet AVB enabled and may be capable of operating in a sparse mode. The network communication system may include devices that do not use sparse mode. This may be advantageous in that a network communication system may not need to be completely renovated and/or modified to accommodate sparse mode operation. Instead, devices which are capable of operating in a sparse mode may be added and/or intermingled with non-sparse mode enabled devices.

Figure 5:
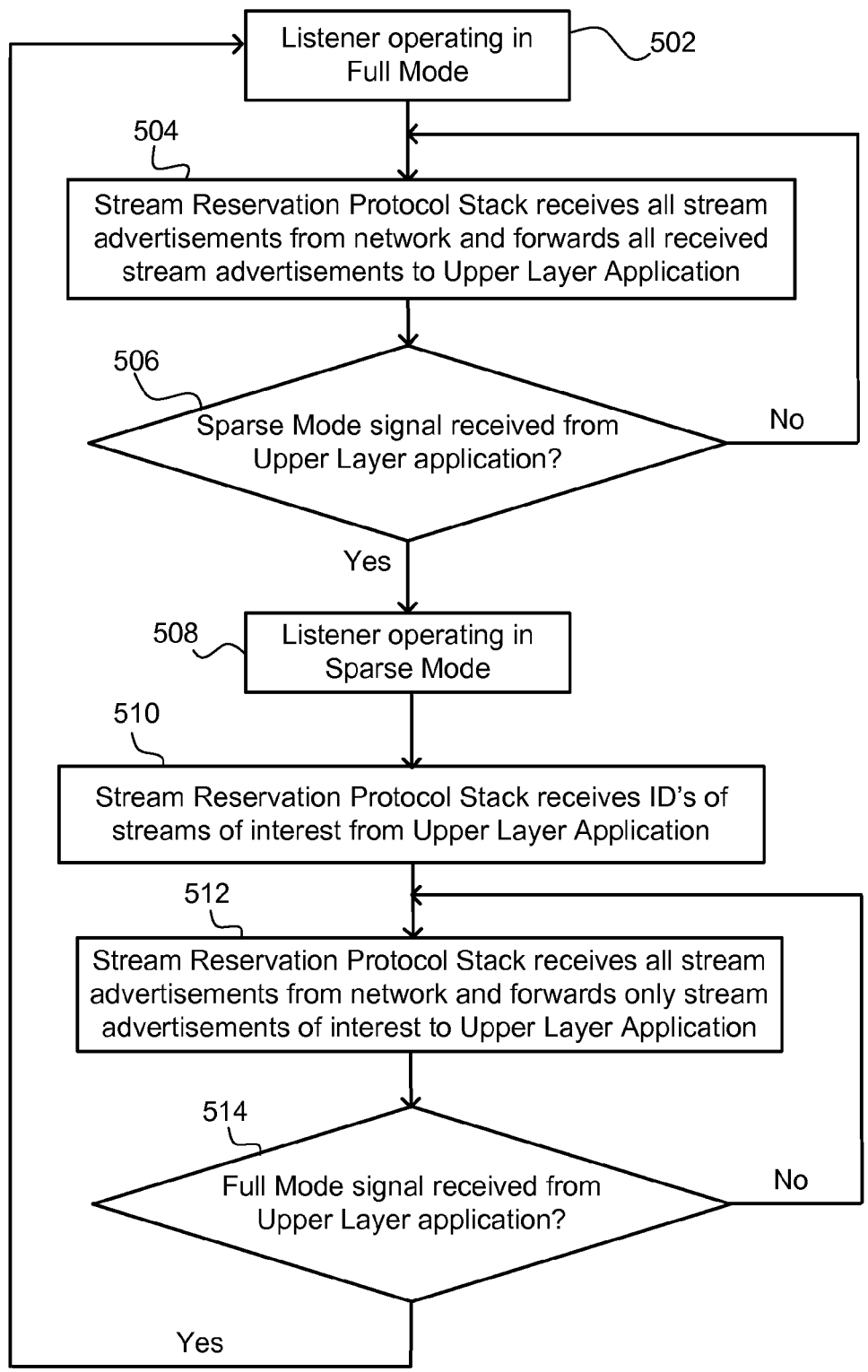
FIG. 5 is a flow diagram of an example method of operation of a listener in a network communication system.

FIG. 5 illustrates a method of operation for a stream reservation protocol stack 230 and/or a sparse mode engine 260 of the listener 210. The method of FIG. 5 may begin at block 502 with the listener operating in full mode. The method may proceed to block 504, where the stream reservation protocol stack 230 may receive all stream advertisements 310, 311, 312, and 313 from the network 110. At block 504, all of the received stream advertisements 310, 311, 312, and 313 may be transmitted, output, sent, forwarded, and/or passed to the upper layer application 220 of the listener 210.

The method may proceed to block 506, where it is determined whether or not a sparse mode signal is received. For example, at block 506 it may be determined whether a mode switch signal 410 specifying "Mode=Sparse" is received by the stream reservation protocol stack 230 from an upper layer application 220. If no sparse mode signal is received at block 506, the method may return to block 504. In some methods, the stream reservation protocol stack 230 may continuously receive all stream advertisements from the network 110 and may forward all received stream advertisements to the upper layer application 220 up to and until a sparse mode signal, such as a mode switch signal 410 specifying a sparse mode, is received by the stream reservation protocol stack 230, at which point the method may proceed to blocks 506 and 508.

If a mode switch signal 410, such as "Mode=Sparse," is received by the stream reservation protocol stack 230 at block 506, the method may proceed to block 508, where the listener 210 now operates in sparse mode. At block 510, the stream reservation protocol stack 230 may receive IDs of data streams of interest from the upper layer application 220, such as in a stream ID query 420. In some methods, the stream ID query 420 may be part of and/or received simultaneously with a mode switch signal 410. The received stream IDs identified in the stream ID query 420 may be stored, for example, in the sparse mode engine 260. Stream ID queries 420 may be received at various times when the listener 210 is operating in sparse mode.

After receiving or otherwise identifying or determining the stream IDs of interest to the listener 210 from the upper layer application 220, the method may proceed to block 512, where the stream reservation protocol stack 230 receives all stream advertisements from the network. At block 512, the stream reservation protocol stack 230 may only forward those stream advertisements which have stream IDs that match the stream IDs identified by the upper layer application 220, such as in the stream ID query 420. For example, the sparse mode engine 260 may compare the stream IDs of the stream advertisements received from or across the network 110 with those stream IDs identified in the stream ID query 420, and may only forward and/or allow to pass those stream advertisements with matching stream IDs.

The method may proceed to block 514, where it is determined whether or not a full mode signal is received. For example, at block 514 it may be determined whether a mode switch signal 410 specifying "Mode=Full," is received by the stream reservation protocol stack 230 from an upper layer application 220. If no full mode signal is received at block 514, the method may return to block 512. In some methods, the stream reservation protocol stack 230 may continuously receive all stream advertisements from the network 110 and may forward only those stream advertisements with matching stream IDs up to and until a full mode signal, such as a mode switch signal 410 specifying a full mode, is received by the stream reservation protocol stack 230, at which point the method may proceed to blocks 514 and 502.

If a mode switch signal 410, such as "Mode=Full," is received by the stream reservation protocol stack 230 at block 514, the method may return to block 502, where the listener 210 now operates in full mode. If no full mode signal was received, the method may return to block 512. In some other systems, the method may return to block 510 if no full mode signal is received. In other systems, the method may return to block 512, but may accept and add any new stream IDs identified by the upper layer application 220 at any time during operation in sparse mode.

The method may proceed continuously in the manner described above when the listener 210 is operating. While the method is shown as beginning at block 502 with the listener 210 operating in full mode, in other circumstances, the method may begin at block 508 with the listener operating in sparse mode. In some systems, once stream IDs have first been identified and/or specified, such as in block 510, this step may be skipped during subsequent method cycles, and/or after a listener 210 has switched operation modes to full mode and then back to sparse mode. Various other alternatives and/or configurations are possible.

Figure 6:
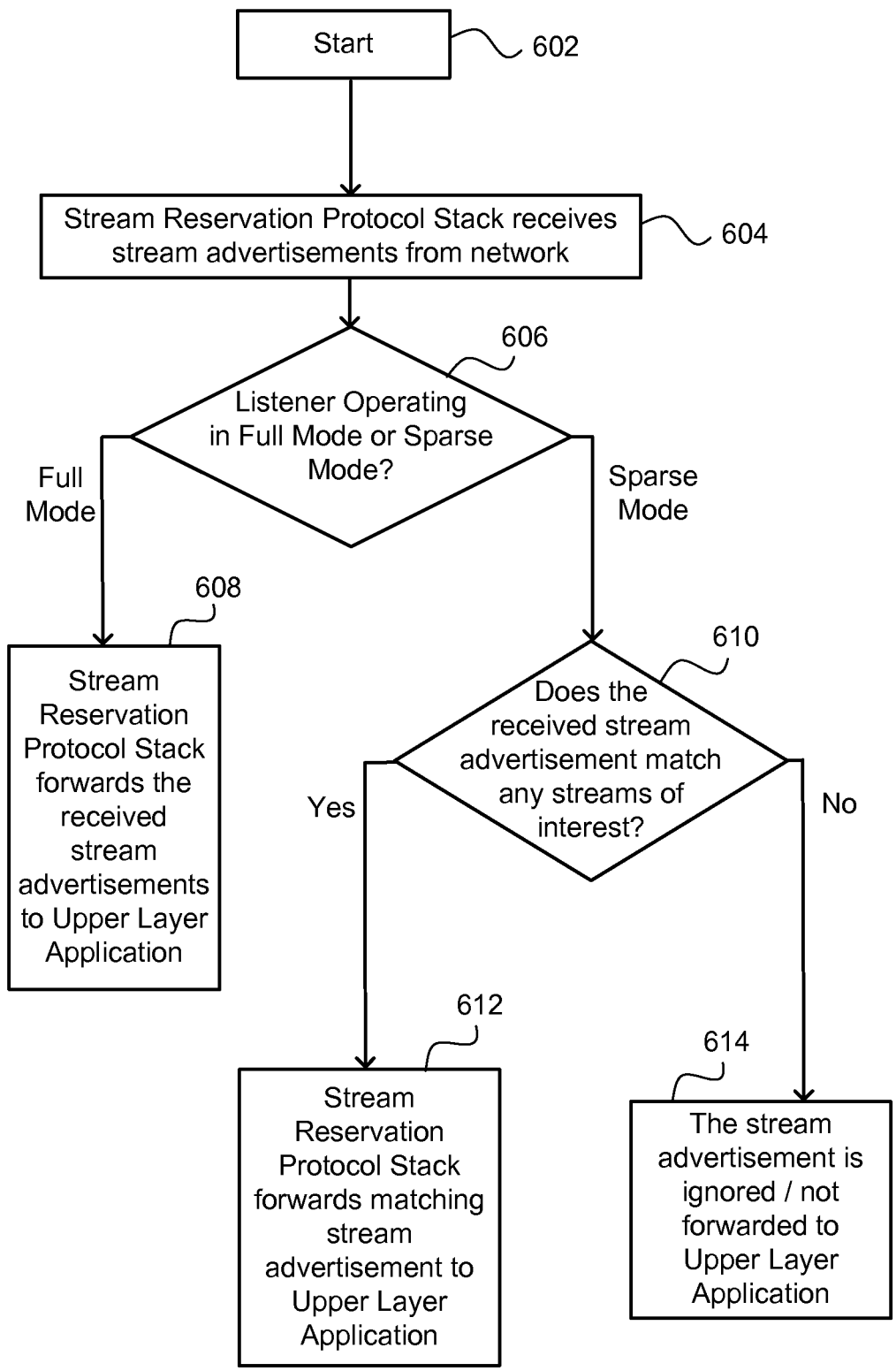
FIG. 6 is a flow diagram of an example method of operation of a listener in a network communication system.

FIG. 6 depicts a method of operation of a listener 210 upon receipt of a stream advertisement from the network. The method may begin at block 602. At block 604, the stream reservation protocol stack 230 may receive the stream advertisement from, across, and/or through the network 110. At block 606, it may be determined whether the listener 210 is operating in a full mode or a sparse mode. While block 606 may be shown as a decision block occurring after receipt of the stream advertisement from the network 110, in some systems, it may be decided and/or apparent before receipt of the stream advertisement what mode the listener 210 may be operating in.

If the listener 210 is operating in the full mode, the method may proceed to block 608, where the stream reservation protocol stack 230 may forward the received stream advertisement to the upper layer application 220. This may be done, for example, regardless of the talker who advertised the stream advertisement and/or the content or information included in the stream advertisement. In this block 608, the sparse mode engine 260 may, for example, forward all streams through to the MSRP attribute database 250, which may then pass the stream advertisements through to the upper layer application 220. If, alternatively, the listener 210 is operating in a sparse mode, the method may proceed to block 610. At block 610, the sparse mode engine 260 may compare the received stream advertisement from the network 110 with any streams identified by the listener 210 and/or the upper layer application 220 as being of interest to the listener 210, such as those stream IDs identified in a stream ID query 420. If the stream advertisement received from the network 110 matches one or more of the streams of interest, such as any of the stream IDs specified in the stream ID query 420, the method may proceed to block 612 where the matching stream advertisement is sent by the sparse mode engine 260 to the MSRP attribute database 250 and on to the upper layer application 220. If, at block 610, the received stream advertisement does not match the streams identified, such as in the stream ID query 420, the method may proceed to block 614, and no stream advertisement may be forwarded by the stream reservation protocol stack 230 to the upper layer application 220. This method may, for example, be repeated each time a stream advertisement is received by the stream reservation protocol stack 230 from the network 110.

A controller 190 may, in some systems, arrange, orchestrate, and/or contribute to the operation of the network communication system and/or various talkers 130, 131, and 132 and/or listeners 140, 141, and 142 operating in a sparse mode. For example, the controller 190 may identify and/or communicate with one or more talkers 130, 131, and 132 that may be connected with the network 110. The controller 190 may identify, specify, assign, and/or otherwise determine a unique stream ID for each of the talkers 130, 131, and 132. For example, the controller 190 may record and/or store designated stream IDs for each of the talkers 130, 131, and 132. Alternatively, the controller 190 may assign each of the talkers 130, 131, and 132 a unique stream ID, and may record and/or store information and/or data about the assigned stream ID. The stream IDs for each of the talkers 130, 131, and 132 may be different from each other, such that an identification of a stream ID may also identify the talker source of the stream. The controller 190 may store and/or access a complete list of stream IDs for some or all of the talkers 130, 131, and 132. In some systems, a controller 190 may access, control, operate, and/or update a separate and/or collective MSRP attribute database with information about each of the talkers 130, 131, and 132, and/or may communicate updates to the MSRP attribute databases 250 of one or more of the talkers 130, 131, and 132 and/or listeners 140, 141, and 142.

The controller 190 may identify and/or communicate with one or more of the listeners 140, 141, and 142. The controller 190 may identify and/or determine which of the talkers 130, 131, and 132 are of importance, relevant to, and/or expected to be used by a listener 140, 141, and 142. For example, each of the listeners 140, 141, and 142 may include listener characteristics which may be received and/or identified by the controller 190. The listener characteristics may identify the specific talkers and/or the data types that the listener 140 may request, require, and/or be interested in. For example, a listener 140 that is a speaker may have a listener characteristic that indicates that the listener 140 is interested in data streams related to a left audio signal. The controller 190 may communicate with the speaker, and/or may determine based on the listener characteristic that the speaker will only be responsive to and/or require data streams that are related to a left audio signal. In other systems, a user may specify to the controller 190 what talkers 130, 131, and 132 and/or data streams one or more of the listeners 140, 141, and 142 may be interested in. Various other methods of determining, with a controller 190, the data streams that a listener 140 may require or be interested in are possible.

The controller 190 may send a signal and/or otherwise communicate with one or more of the listener 140, 141, and 142. The controller 190 may inform and/or alert the listeners 140, 141, and 142 of the stream IDs which the listeners 140, 141, and 142 may be interested in. For example, the controller 190 may communicate with an upper layer application 220 of the listener 140 and send to the upper layer application 220 a list of one or more stream IDs which the listener 140 may be interested in. This communication from the controller 190 to the listener 140 may be made, for example, using a non-SRP protocol and/or without the use of a stream reservation protocol stack 230. The controller 190 may tell a listener 140 to listen and/or monitor stream advertisements across a network 110, and when the listener 140 sees a particular and/or specified stream ID for a data stream being advertised with a stream advertisement, to register to receive that data stream. In some systems, when the listener 140 then enters the sparse mode, the list of one or more stream IDs sent from the controller 190 to the listener 140 may be forwarded from the upper layer application 220 to the sparse mode engine 260 as a stream ID query 420, and the system may operate as previously discussed. In these ways, for example, a controller 190 may assist a listener 140 in operating in a sparse mode. Other methods of operation are possible.

Figure 7:
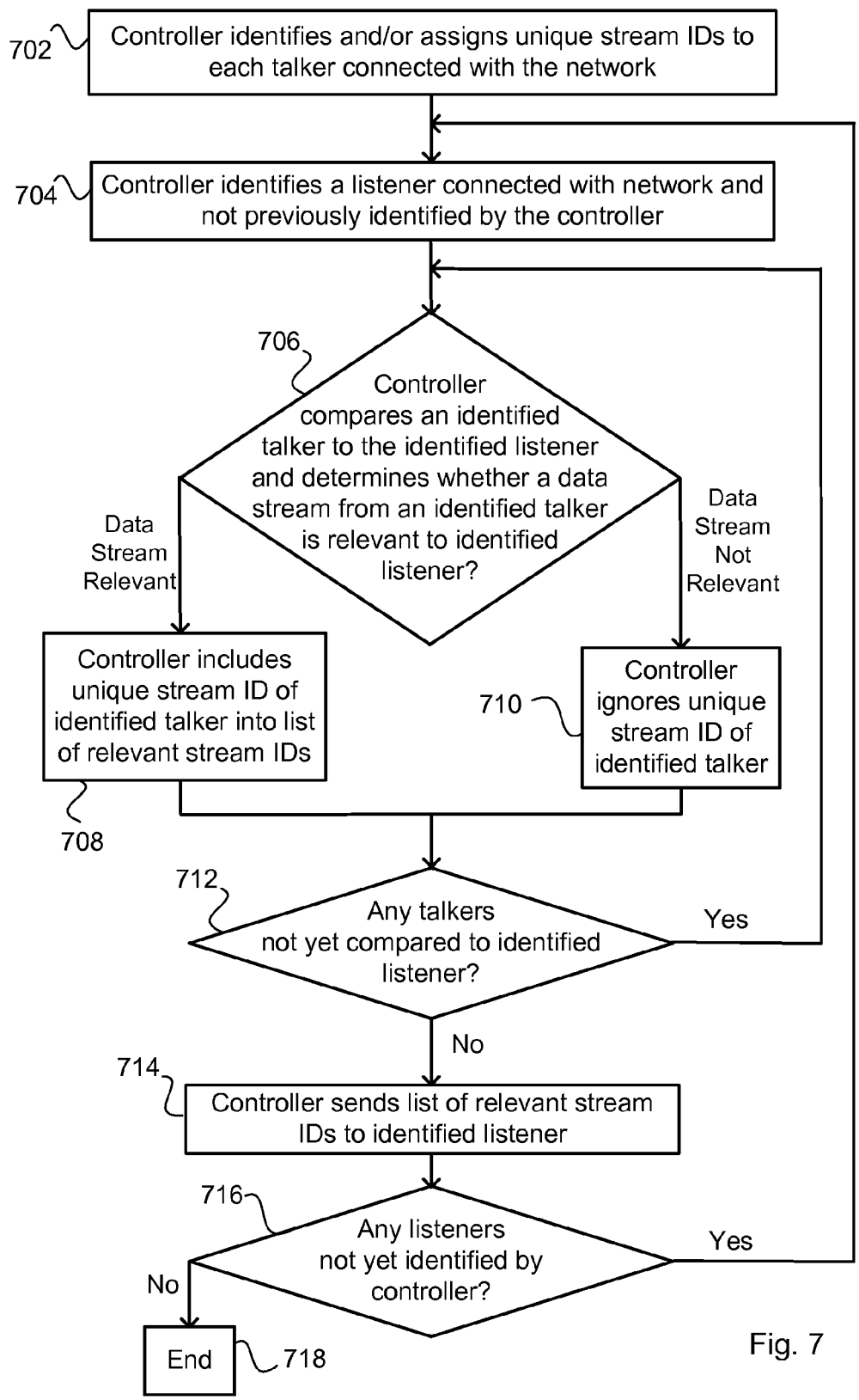
FIG. 7 is a flow diagram of an example method of operation of a controller in a network communication system.

FIG. 7 depicts one method of how a controller 190 may function in a sparse mode in a network communication system with one or more talkers 130, 131, and 132 and/or one or more listeners 140, 141, and 142. The method may begin at block 702 where a controller 190 may identify and/or assign unique stream IDs to each talker 130, 131, and 132 connected with a network 110. In some systems, the controller 190 may merely identify and/or determine the pre-assigned and/or designated unique stream ID already existing for each talker 130, 131, and 132. In other systems, the controller 190 may assign a unique stream ID to each talker 130, 131, and 132.

In block 704, the controller 190 may identify a listener 140 connected with the network 110 and not previous identified by the controller 190. In block 706, the controller 190 may compare a first identified talker 130 to the identified listener 140. The controller 190 may determine, such as through a comparison of talker attributes, listener attributes, listener characteristics and/or through rules and/or logic implemented in the controller 190, whether a stream advertisement and/or data stream from the first identified talker 130 may be relevant and/or of interest to the identified listener 140. If the stream advertisement and/or data stream may be relevant, such as in the case of a microphone talker and a microphone speaker listener, the method may move to block 708. In block 708, the controller 190 may include the unique stream ID of the first identified talker 130 into a list of relevant stream IDs for the identified listener 140. If, on the other hand, the stream advertisement and/or data stream is not relevant to the identified listener 140, the method may move to block 710 and the controller 190 may ignore and/or not add the unique stream ID of the identified talker 130.

After blocks 708 or 710, the method may move to block 712, where it is determined whether or not there are any talkers that have not yet been compared to the identified listener 140. Where there are talkers, such as talkers 131-132, that have not yet been compared to the listener 140 to determine if stream advertisements and/or data streams from the talkers 131-132 may be relevant to the identified listener, the method may return to block 706, and another talker not previously identified, such as talker 131, may be compared. This process may continue until all talkers 130, 131, and 132 have been compared to the listener 140 and the relevancy of all possible stream advertisements and/or data streams to the identified listener 140 have been considered.

Where no talkers remain to be compared to the identified listener at block 712, the method may proceed to block 714. At block 714, the controller 190 may send the completed list of relevant stream IDs, as determined in blocks 706-710, to the identified listener 140. In some circumstances, the list of relevant stream IDs may be sent together as one piece of information and/or data. In other circumstances, a relevant stream ID may be sent to the listener 140 as soon as the controller 190 has determined that the stream ID may be relevant, such as immediately after block 708. Various other configurations are possible.

After block 714, the method may proceed to block 716, where it is determined whether or not any listeners, such as listeners 141-142, have not yet been identified by the controller 190. If there are listeners that have not been identified by the controller 190, the method may return to block 704, and the controller may identify another listener, such as listener 141, and proceed through blocks 706-714 as previously discussed. This method may continue until lists of relevant stream IDs have been sent to all listeners 140, 141, and 142. If, in block 716, no listeners have yet to be identified by the controller 190, the method may end at block 718. In other systems, the controller 190 may periodically and/or continuously search for and identify all talkers 130, 131, and 132 and/or listeners 140, 141, and 142 on the network, and/or may update lists of relevant stream IDs sent to the listeners 140, 141, and 142. Various other methods are possible.

Figure 8:
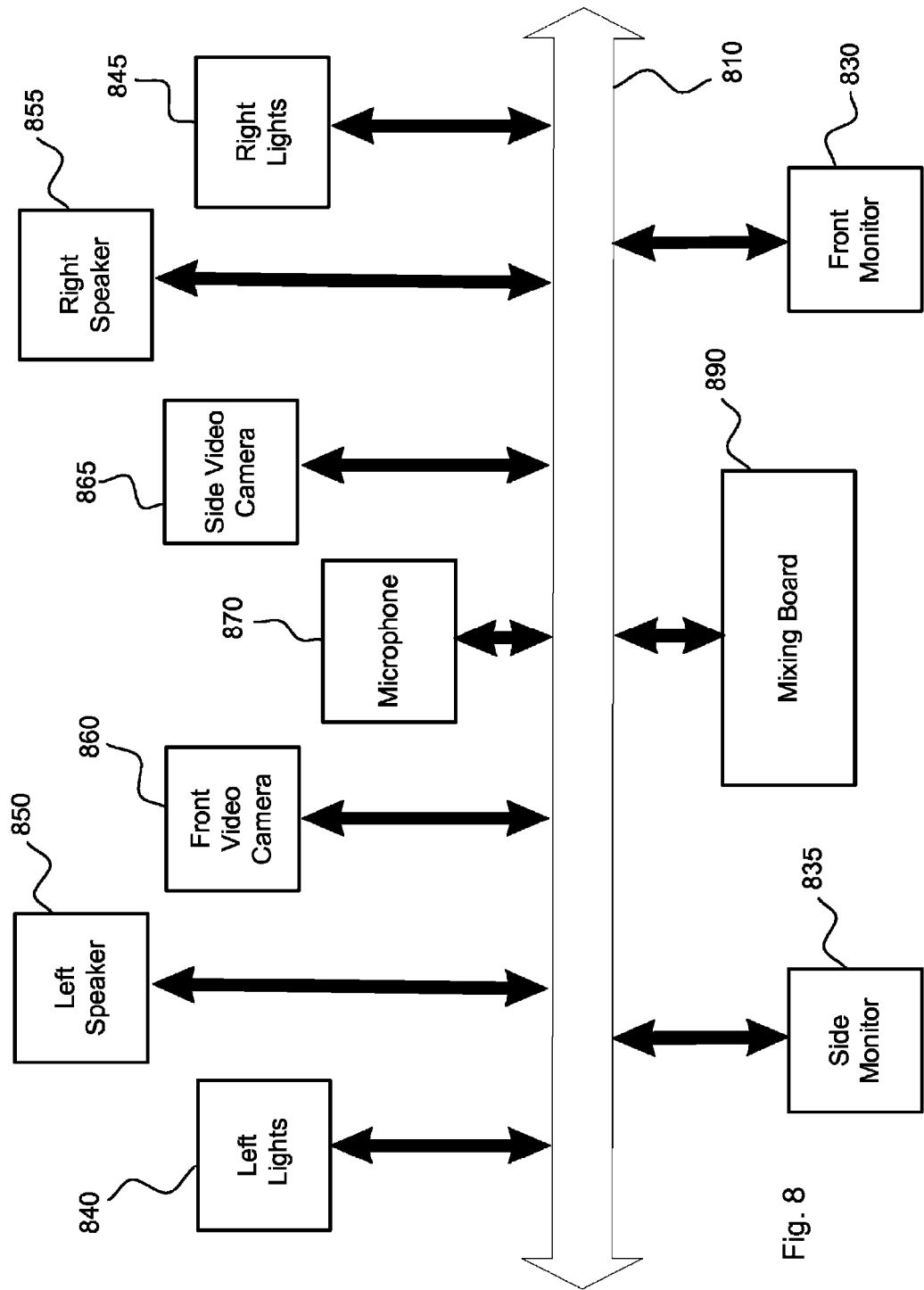
FIG. 8 is a block diagram of an example network communication system.

FIG. 8 illustrates an audio video network system which may include a network 810 connecting a number of talkers and listeners and a controller. The network 810 may be or resemble the network 110. The network 110 may, for example, be an Ethernet AVB network. Other variations are possible.

The audio video network system may include one or more talkers, such as front video camera 860, side video camera 865, and a microphone 870. One or more of the front video camera 860, side video camera 865, and a microphone 870 may be Ethernet AVB enabled devices. In some systems, the audio video network system may include more or less talkers. For example, the audio video network may include ten different video cameras recording video at ten different positions on a stage, ten different microphones recording audio from ten different sources, and/or various other talkers. Various numbers and combinations of talkers may be included in the network. While the talkers in the audio video network system may be, and may be described as, the actual devices themselves, such as a video camera or a microphone, it should be appreciated that in some systems, the talker may be or may include a computer or other electronic controlling device which may be used and/or operate to control the video camera or the microphone, such as some or all of the features of a computer system 1000 shown in FIG. 10 and described later.

The front video camera 860 may, for example, be a video camera directed to a front of a stage. The side video camera 865 may be a video camera directed to a side of the stage, and may otherwise function similarly to the front video camera 860. The front video camera 860 and/or side video camera 865 may record, receive, process, and/or distribute information and data related to a video recorded by the front video camera 860 and/or side video camera 865. The front video camera 860 and/or side video camera 865 may advertise, output, and/or communicate, such as through a stream advertisement, that the front video camera 860 has information and/or data related to the recorded video that the front video camera 860 wishes to stream across the Ethernet AVB network 810, such as with or using a data stream or other data signal. This stream advertisement may be received by one or more of the other talkers and listeners connected with the Ethernet AVB network 810, which, if interested in the stream, may register for and/or receive the advertised data streams. One or both of the front video camera 860 and side video camera 865 may advertise information and/or data streams across the Ethernet AVB network 810 simultaneously, such as with simultaneous stream advertisements.

The microphone 870 may, for example, be a microphone placed on a stage. The microphone may record, received, process, and/or distribute information and data related to audio recorded by the microphone 870. The microphone 870 may advertise, output, and/or communicate, such as with a stream advertisement, that the microphone 870 wishes to stream the information and/or data related to the recorded audio across the Ethernet AVB network 810 with or using a data stream or other data signal. This stream advertisement may be received by one or more of the other talkers and listeners connected with the Ethernet AVB network 810, which, if interested in the stream, may register for and/or receive the advertised data streams. Information may be advertised by the microphone 870 and one or more other talkers simultaneously, such as with simultaneous stream advertisements. In some systems, no data is sent by a talker, such as the microphone 870, when no registrations for the data streams have been received.

The audio video network system may include one or more listeners, such as the left lights 840, the right lights 845, the left speaker 850, the right speaker 855, the side monitor 835, and/or the front monitor 840. One or more of the left lights 840, the right lights 845, the left speaker 850, the right speaker 855, the side monitor 835, and/or the front monitor 840 may be Ethernet AVB enabled devices. In some systems, the audio video network system may include more or less listeners. For example, the audio video network may include ten different speakers at ten different positions facing an audience, ten different television monitors showing ten different videos from ten different sources, and/or various other listeners. Various numbers and combinations of listeners may be included in the network. While the listeners in the audio video network system may be, and may be described as, the actual devices themselves, such as the left lights or front monitor, it should be appreciated that in some systems, the listener may be or may include a computer or other electronic controlling device which may be used and/or operate to control the left lights or front monitor, such as some or all of the features of a computer system 1000 shown in FIG. 10 and described later.

The left lights 840 and the right lights 845 may, for example, be lights or light controlling electronics connected to the lights. The left lights 840 and/or the right lights 845 may operate based on signals received over the network 810. For example, the left lights 840 may turn on when a "left lights=ON" signal is received across the network, such as from the mixing board 890. The right lights 845 may turn on when a "right lights=ON" signal is received across the network, such as from the mixing board 890. The left lights 840 and/or the right lights 845 may not process or have any response to other commands or signals, such as audio signals advertised by the microphone 870. The left lights 840 and/or the right lights 845 may receive and store information about received stream advertisements and/or data streams, but may otherwise ignore such commands or signals.

The left speaker 850 and the right speaker 855 may be audio speakers or audio speaker controlling electronics connected to a left and/or right speaker. The left speaker 850 and/or right speaker 855 may, for example, respond to and/or operate based on audio data streams or signals received over the network 810. For example, the left speaker 850 may process and/or output a left audio data stream or signal over the network, such as a left audio data stream from the mixing board 890 and/or from the microphone 870. The right speaker 855 may process and/or output a right audio data stream or signal over the network, such as a right audio data stream from the mixing board 890 and/or from the microphone 870. The left speaker 850 and/or the right speaker 855 may not process or have any response to other commands or signals, such as light control signals advertised by the mixing board or video data streams or signals advertised by the front video camera 860 or side video camera 865. The left speaker 850 and/or the right speaker 855 may receive and store information about received stream advertisements and/or data streams, but may otherwise ignore such commands or signals.

The side monitor 835 and the front monitor 830 may be video monitors such as television monitors or video monitor controlling electronics connected with video monitors. The side monitor 835 and/or front monitor 830 may, for example, respond to and/or operate based on received video data streams or signals received over the network, such as data streams advertised and/or sent by the side video camera 865 and/or the front video camera 860. For example, the side monitor 835 may process and/or output a side video data stream or signal advertised over the network 810, such as a side video data stream from the side video camera 865 or the mixing board 890. The front monitor 830 may process and/or output a front video data stream or signal advertised over the network 810, such as a front video data stream from the front video camera 860 or the mixing board 890. The side monitor 835 and the front monitor 830 may not process or have any response to other commands or signals, such as light control signals advertised by the mixing board 890 or audio data streams or signals advertised by the microphone 870. The side monitor 835 and the front monitor 830 may receive and store information about received stream advertisements and/or data streams, but may otherwise ignore such commands or signals.

The mixing board 890 of the system may perform numerous functions. In some systems, one or all of the talkers and/or listeners may be connected to the mixing board 890. The mixing board 890 may act as a hub for all of the stream advertisements, data streams and/or signals sent by talkers across the network 810. In some systems, the mixing board 890 may adjust and/or process data streams that may be sent by talkers across the network 810. In other systems, one or more talkers and/or listeners may be directly connected, and/or the data streams from the talkers may pass across the network 810 and/or may not be received and/or monitored or controlled by the mixing board 890. The mixing board 890 may be or may include an application and/or computer program which may allow a user to pre-arrange, create, and/or edit the responsibilities of talkers and listeners, such as throughout a performance on a stage.

The mixing board 890 may identify, specify, and/or store information regarding each of the talkers, such as the front video camera 860, the side video camera 865, and/or the microphone 870. The mixing board 890 may identify, or in some cases may assign, a specific and/or unique stream ID to each of the talkers 860, 865, and/or 870.

Any of the listeners 830, 835, 840, 845, 850, and/or 855 may operate in one or more modes, such as in a sparse mode or a full mode. In some systems, the mixing board 890 may identify and/or receive information from one or more of the listeners 830, 835, 840, 845, 850, and/or 855. The mixing board 890 may identify and/or determine those talkers 860, 865, and/or 870, stream advertisements, stream IDs, and/or data streams sent from those talkers 860, 865, and/or 870 which may be of interest and/or used by each of the listeners 830, 835, 840, 845, 850, and/or 855.

The mixing board 890 may communicate to each of the listeners 830, 835, 840, 845, 850, and/or 855 the specific and/or unique stream IDs of the data streams from the talkers 860, 865, and/or 870 of interest and/or useful to the listeners. The stream IDs sent by the mixing board 890 may be sent to a sparse mode engine 260 in each listener that is, is to be, and/or is configured or operable to be operated in sparse mode. The sparse mode engine 260 of each listener 830, 835, 840, 845, 850, and/or 855 may then only pass those stream advertisements with a stream ID matching those stream IDs sent by the mixing board 890 onto the upper layer applications 220 of the listener operating in sparse mode. In some systems, the mixing board 890 may communicate the specific and/or unique stream IDs of talkers that are of interest to listeners only when the listeners are operating in, or capable of operating in, sparse mode. In other systems, the mixing board 890 may communicate the specific and/or unique stream IDs of talkers that are of interest to listeners to all listeners 830, 835, 840, 845, 850, and/or 855. Various other combinations are possible. Each of the listeners 830, 835, 840, 845, 850, and/or 855 that are capable of operating in both a sparse mode and/or a full mode may be configured and/or operate in either mode in a manner similar to the listeners 140, 141, and 142 and/or listener 210 as previous described. Various other configurations are possible.

In some systems, no controller 190 may be necessary or included. For example, in some systems, one or more listeners 140, 141, and 142 may be programmed to know one or more talkers 130, 131, and 132 which the listener 140, 141, and 142 may be interested in. In these systems, the sparse mode engine 260 of the listener 140, 141, and 142 may still receive a stream ID query 420 from the upper layer application 220 identifying those stream IDs that the listener may be interested in, or the sparse mode engine 260 may already be programmed to know the stream IDs that the listener is interested in. In these systems, the sparse mode engine 260 may operate to filter out stream advertisements that are not relevant or of interest to the listener 210.

Figure 9:
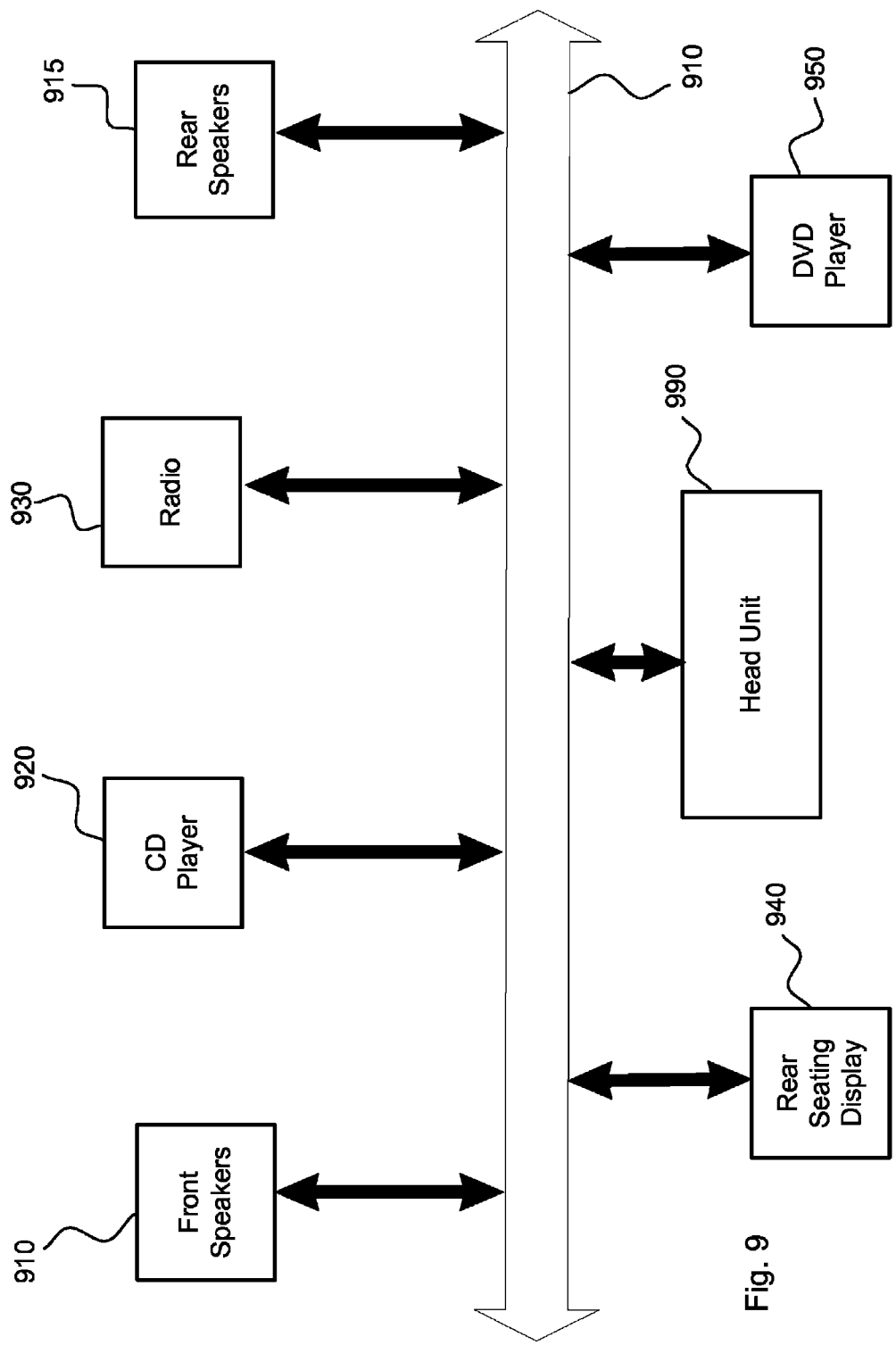
FIG. 9 is a block diagram of an example network communication system.

A situation where a controller 190 may not be required may exist, for example, in systems which are unlikely to change or add talkers or listeners over an extended period of time. An example of such a system may be the automobile communication system shown in FIG. 9. The automobile communication system in FIG. 9 may include one or more of front speakers 910, rear speakers 915, a CD player 920, a radio 930, a rear seating display monitor 940, a DVD player 950, and/or a head unit 990.

The front speakers 910 may be programmed to recognize and play audio from audio data streams and/or signals advertised by the CD player 920 and/or the radio 930. The front speakers 910 may include rules and/or logic to determine which audio data streams and/or signals to play, when audio data streams are received from both the CD player 920 and the radio 930.

The front speakers 910 may be similar to and/or resemble any of the listeners 140, 141, and 142 and/or listener 210. The front speakers 910 may have an upper layer application 220 which may control the operation of the physical speakers, and a stream reservation protocol stack 230 which may include a sparse mode engine 260. The upper layer application 220 and/or the sparse mode engine 260 may be programmed and/or aware that the only stream advertisements and/or data streams of importance to the front speakers 910 may be those stream advertisements and/or data streams from the talker CD player 920 and the talker radio 930. Where the upper layer application 220 is programmed, the upper layer application may send a mode switch signal 410 to the sparse mode engine 260 to initiate and/or switch between a full mode operation and a sparse mode operation. In other systems, the sparse mode engine 260 may already know the stream IDs. In these systems, the sparse mode engine 260 may be permanently activated and/or operate in a sparse mode continuously, or alternatively may be directed and/or controlled by mode switch signals 410 from the upper layer application 220. In either case, in sparse mode, the sparse mode engine 260 may operate as in listener 210 previous discussed, and may only transmit, output, send, forward, and/or pass stream advertisements with stream IDs that match the stream IDs of the CD player 920 and/or the talker radio 930.

The rear speakers 915 may be similar to and/or resemble any of the listeners 140, 141, and 142 and/or listener 210, and/or may resemble the front speakers 910 in operation. The upper layer application 220 and/or the sparse mode engine 260 of the rear speakers 915 may be programmed and/or aware that the only stream advertisements and/or data streams of importance to the rear speakers 915 may be those stream advertisements and/or data streams from the talker CD player 920, the talker radio 930, and/or the DVD player 950. The rear speakers 915 may include rules and/or logic to determine which audio data streams and/or signals to play, when audio data streams are received from more than one of the CD player 920, the radio 930, and/or the DVD player 950. Where the upper layer application 220 is programmed, the upper layer application may send a mode switch signal 410 to the sparse mode engine 260 to initiate and/or switch between a full mode operation and a sparse mode operation. In other systems, the sparse mode engine 260 may already know the stream IDs. In these systems, the sparse mode engine 260 may be permanently activated and/or operate in a sparse mode continuously, or alternatively may be directed and/or controlled by mode switch signals 410 from the upper layer application 220. In sparse mode, the sparse mode engine 260 of the rear speakers 915 may operate as in listener 210 previous discussed, and may only transmit, output, send, forward, and/or pass stream advertisements with stream IDs that match the stream IDs of the CD player 920, the talker radio 930, and/or the DVD player 950.

The rear seating display monitor 940 may be similar to and/or resemble any of the listeners 140, 141, and 142 and/or listener 210, and/or may resemble the front speakers 910 or rear speakers 915 in operation. The upper layer application 220 and/or the sparse mode engine 260 of the rear seating display monitor 940 may be programmed and/or aware that the only stream advertisements and/or data streams of importance to the rear seating display monitor 940 may be those stream advertisements and/or data streams from the DVD player 950. Where the upper layer application 220 is programmed, the upper layer application may send a mode switch signal 410 to the sparse mode engine 260 to initiate and/or switch between a full mode operation and a sparse mode operation. In other systems, the sparse mode engine 260 may already know the stream IDs. In these systems, the sparse mode engine 260 may be permanently activated and/or operate in a sparse mode continuously, or alternatively may be directed and/or controlled by mode switch signals 410 from the upper layer application 220. In sparse mode, the sparse mode engine 260 of rear seating display monitor 940 may operate as in listener 210 previous discussed, and may only transmit, output, send, forward, and/or pass stream advertisements with stream IDs that match the stream IDs of the DVD player 950.

The system may also include a head unit 990. In some systems, the head unit 990 may act as a controller 190, but this is not required. The head unit 990 may, in some circumstances, operate and/or control one or more of the talkers, such as the CD player 920, the radio 930, and/or the DVD player 950. In some systems, the head unit 990 may perform and/or determine the rules or logic which may identify what data stream is to be processed and/or played by one or more of the listeners, but this is not required.

Various other systems may use and/or incorporate the sparse mode features and components described. For example, a home theater system may have numerous talkers, such as DVD players, HDMI devices, mp3 players, cable boxes, satellite receivers, and various other talkers, as well as numerous listeners, such as speakers, television screens, and various other listeners. In some home theater systems, a talker/listener, such as an audio-video receiver or other receiver, may be attached and/or connected with one or more of the talkers and listeners, such as over an Ethernet AVB network. The talkers, listeners, and/or talker/listeners of the home theater network may operate and/or resemble the talkers 130, 131, and 132, the listeners 140, 141, and 142, and/or the talker/listener 150. In another example, a sparse mode engine and/or sparse mode capabilities may be added to numerous other devices, such as a matrix controller. While the systems and methods described may often be discussed in connection with MSRP attributes, it should be appreciated that these techniques may be applied to Multiple MAC Registration Protocol ("MMRP") attributes as well. Other variations are possible.

Figure 10:
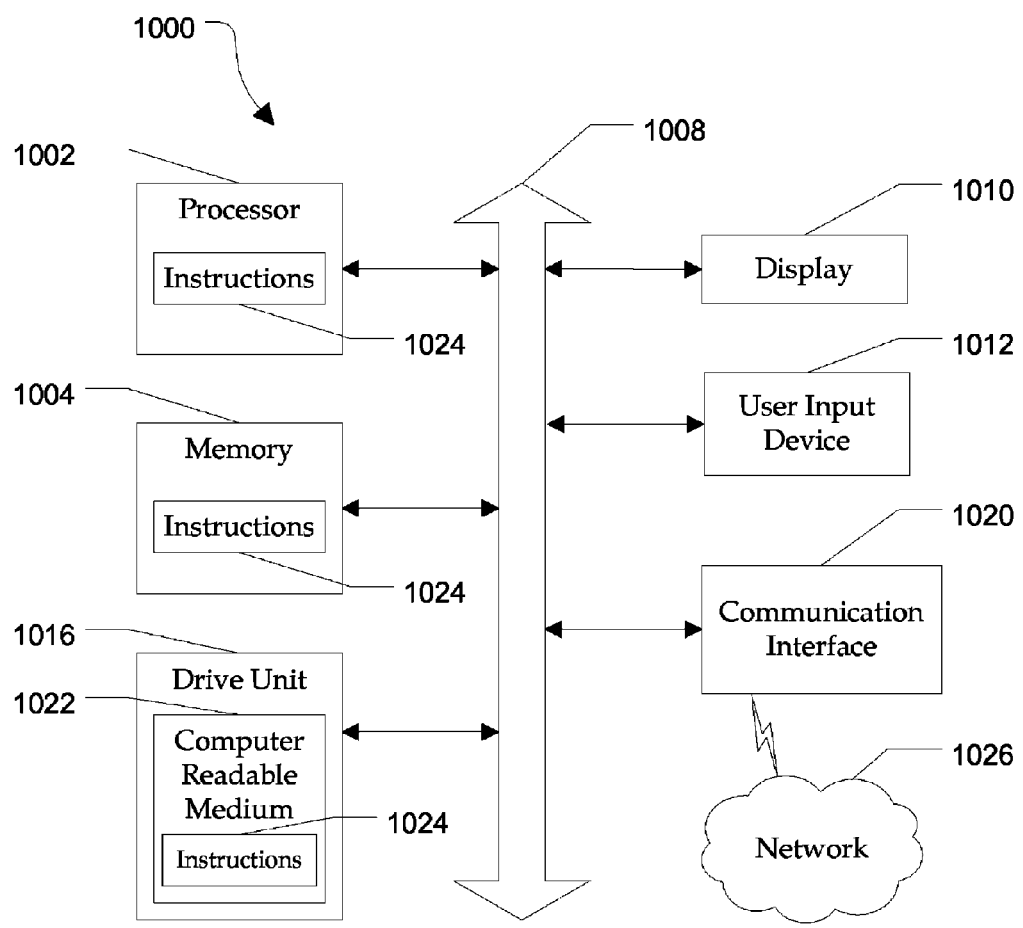
FIG. 10 is an example of a processing system for use with one or more components in the network communication system.

One or more of the talkers 130, 131, and 132, listeners 140, 141, and 142, talker/listeners 150, and/or controllers 190 may be and/or may include a portion or all of one or more computing devices of various kinds, such as the computing device in FIG. 10. FIG. 10 illustrates an example of a general computer system designated 1000. Any of the components from the listener 210, such as the upper layer application 220, the stream reservation protocol stack 230, the MSRP attribute database 250, and/or the spare mode engine 260, may include a portion or all of the computer system 1000. The computer system 1000 can include a set of instructions that can be executed to cause the computer system 1000 to perform any one or more of the methods or computer based functions disclosed. The computer system 1000 may operate as a standalone device or may be connected, e.g., using a network, to other computer systems or peripheral devices.

In a networked deployment, the computer system 1000 may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular example, the computer system 1000 can be implemented using electronic devices that provide voice, audio, video or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The term "module" may be defined to include a plurality of executable modules. As described herein, the modules are defined to include software, hardware or some combination thereof executable by a processor, such as processor 1002. Software modules may include instructions stored in memory, such as memory 1004, or another memory device, that are executable by the processor 1002 or other processor. Hardware modules may include various devices, components, circuits, gates, circuit boards, and the like that are executable, directed, and/or controlled for performance by the processor 1002.

The computer system 1000 may include a memory 1004, such as a memory 1004 that can communicate via a bus 1008. The memory 1004 may be a main memory, a static memory, or a dynamic memory. The memory 1004 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1004 includes a cache or random access memory for the processor 1002. In alternative examples, the memory 1004 is separate from the processor 1002, such as a cache memory of a processor, the system memory, or other memory. The memory 1004 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1004 is operable to store instructions executable by the processor 1002. The functions, acts or tasks illustrated in the figures or described may be performed by the programmed processor 1002 executing the instructions stored in the memory 1004. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 1000 may or may not further include a display unit 1010, such as a liquid crystal display (LCD), an organic light emitting diode (OLED), a flat panel display, a solid state display, a cathode ray tube (CRT), a projector, a printer or other now known or later developed display device for outputting determined information. The display 1010 may act as an interface for the user to see the functioning of the processor 1002, or specifically as an interface with the software stored in the memory 1004 or in the drive unit 1016.

Additionally, the computer system 1000 may include an input device 1012 configured to allow a user to interact with any of the components of system 1000. The input device 1012 may be a number pad, a keyboard, or a cursor control device, such as a mouse, or a joystick, touch screen display, remote control or any other device operative to interact with the computer system 1000.

In a particular example, as depicted in FIG. 10, the computer system 1000 may also include a disk or optical drive unit 1016. The disk drive unit 1016 may include a computer-readable medium 1022 in which one or more sets of instructions 1024, e.g. software, can be embedded. Further, the instructions 1024 may embody one or more of the methods or logic as described. In a particular example, the instructions 1024 may reside completely, or at least partially, within the memory 1004 and/or within the processor 1002 during execution by the computer system 1000. The memory 1004 and the processor 1002 also may include computer-readable media as discussed above.

The present disclosure contemplates a computer-readable medium that includes instructions 1024 or receives and executes instructions 1024 responsive to a propagated signal so that a device connected to a network 1026 can communicate voice, video, audio, images or any other data over the network 1026. Further, the instructions 1024 may be transmitted or received over the network 1026 via a communication port or interface 1020, and/or using a bus 1008. The communication port or interface 1020 may be a part of the processor 1002 or may be a separate component. The communication port 1020 may be created in software or may be a physical connection in hardware. The communication port 1020 may be configured to connect with a network 1026, external media, the display 1010, or any other components in system 1000, or combinations thereof. The connection with the network 1026 may be a physical connection, such as a wired Ethernet connection or may be established wirelessly as discussed later. Likewise, the additional connections with other components of the system 1000 may be physical connections or may be established wirelessly. The network 1026 may alternatively be directly connected to the bus 1008.

The network 1026 may include wired networks, wireless networks, Ethernet AVB networks, or combinations thereof. The wireless network may be a cellular telephone network, an 802.11, 802.16, 802.20, 802.1Q or WiMax network. Further, the network 1026 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In an example, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, can be constructed to implement various parts of the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

The system described may be implemented by software programs executable by a computer system. Further, in a non-limited example, implementations can include distributed processing, component/object distributed processing, and parallel processing. Alternatively, virtual computer system processing can be constructed to implement various parts of the system.

The system is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

Operation of a listener 210 in sparse mode may be advantageous to the listener 210 for many reasons. Listeners 140, 141, and 142 connected with a network 110 may be configured and/or operable to receive and store stream advertisements and/or data streams of interest to the listeners 140, 141, and 142 at the upper layer applications 220. This may free up memory, processing power, and/or other resources of the listeners 140, 141, and 142, which may be dedicated and/or used for other functions. Sparse mode and/or sparse mode engines may allow an Ethernet AVB end-station and/or device to only report and store information related to stream IDs the device is interested in. The upper layer applications 220 of the listener 210 may not receive, have to parse through, and/or store information related to stream advertisements and/or data streams which the listener 210 may not be interested in and/or further process. For example, a listener 210 that may be a speaker may not understand, process, and/or care about a video data stream from a front camera. The listener 210 may be a low power and limited memory device. In full mode, the listener 210 may still, however, receive at least the stream advertisements from the front camera, and may be required to consider and/or store information related to the video data stream. In sparse mode, the upper layer application 220 may not receive the stream advertisement, which the upper layer application 220 is not interested in, and may not have to devote any resources or memory to the video data stream. As such, upper layer application 220 and/or listener 210 may not occupy resources and/or memory to stream advertisements and/or data streams that may be irrelevant to the upper layer application 220. This may free up resources for the upper layer application 220 and/or listener 210 that can be devoted to other processes of more interest to the upper layer application 220 and/or listener 210.

Sparse mode and/or sparse mode engines may reduce CPU overhead and memory storage requirements in AVB enabled devices, which may become increasingly important and effective as more data streams are added to a network 110. This may allow AVB enabled devices with low power and/or small footprints to co-exist with large stream count networks. In addition, more powerful devices may take advantage of sparse mode to allow more system resources to be available for other purposes, including, but not limited to, a more responsive "feel" to the user.

In addition, configuring the listeners 140, 141, and 142 to be capable of operating in a sparse mode may require minimal adjustments, such as adding a sparse mode engine 260. Also, switching between operation in a full mode and a sparse mode may merely require a signal or other notification, such as a mode switch signal 410, to be sent to the sparse mode engine 260, leaving all other components of the listeners 140, 141, and 142 unchanged and/or undisturbed and/or operating in a continuous and/or unchanging mode. No components of the listener 210 may need to be reconfigured and/or altered between a full mode and a sparse mode, other than a sparse mode engine 260. Another advantage may be that devices which may be operable in sparse mode may be intermingled with non-sparse mode devices in a network without required a reconfiguration of the network.

As another advantages, in some systems, the upper layer application 220 of a listener 210 may experience a software restart because of a firmware update. When that happens, the listener 210 may either restart stream reservation protocol stack 230, which wasn't affected by the restart, or may query the stream reservation protocol stack 230 with a special stream ID query. The special stream ID query may request information about every stream a sparse mode engine 260 has already heard about. Normally a firmware update and restart would cause a temporary interruption in A/V streaming. By allowing the hardware to continue to play the A/V streams while the upper layer application 220 is reset, the sparse mode may make the reset transparent to someone listening to the audio or watching the video streams. Various other advantages of the above-described system are possible.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A listener system for use with an Ethernet Audio-Video Bridging ("AVB") network, the listener system comprising:

a processor;

an upper layer application executable by the processor, and when executed by the processor, is configured to transmit a stream identifier identifying a data stream relevant to the listener system; and a stream reservation protocol stack executable by the processor, and when executed by the processor, is configured to:

receive the stream identifier identifying a data stream relevant to the listener system from the upper layer application;

receive stream advertisements on the Ethernet AVB network, each of the stream advertisements comprising a stream identifier identifying a data stream to be communicated over the Ethernet AVB network; and operate in a sparse mode and a full mode;

where the stream reservation protocol stack, when operating in the sparse mode, is further configured to compare the received stream advertisements with the stream identifier received from the upper layer application, and in response to the comparison:

transmit a first stream advertisement of the received stream advertisements to the upper layer application in response to a stream identifier included in the first stream advertisement matching the stream identifier received from the upper layer application, and not transmit a second stream advertisement of the received stream advertisements to the upper layer application in response to a stream identifier included in the second stream advertisement not matching the stream identifier received from the upper layer application; and where the stream reservation protocol stack, when operating in the full mode, is further configured not to compare the received stream advertisements with the stream identifier received from the upper layer application.

2. The listener system of claim 1, where the upper layer application is configured to generate and transmit a query to the stream reservation protocol stack, the query identifying data streams relevant to the listener system.

3. The listener system of claim 2, where the stream reservation protocol stack is further configured to transmit a first subset of the received stream advertisements to the upper layer application, the first subset comprising the first stream advertisement, and where each stream advertisement in the first subset identifies one of the data streams relevant to the listener identified in the query.

4. The listener system of claim 3, where the received stream advertisements comprises a second subset of the received stream advertisements, the second subset comprising the second stream advertisement, and where no stream advertisements in the second subset identify any of the data streams relevant to the listener identified in the query.

5. The listener system of claim 2, where the query includes a list of talker attributes that identify the data streams relevant to the listener system.

6. The listener system of claim 5, where each of the talker attributes comprises a unique stream identifier that uniquely identifies one of the data streams relevant to the listener system.

7. The listener system of claim 2, where the upper layer application is further configured to receive a signal from a controller in communication with the Ethernet AVB network prior to generation and transmittal of the query to the stream reservation protocol stack, the signal specifying the data streams relevant to the listener, and where the query transmitted by the upper layer application to the stream reservation protocol stack consists of stream identifiers for the data streams specified in the signal from the controller.

8. The listener system of claim 1, where the received stream advertisements consist of stream advertisements in a first subset comprising at least one of the received stream advertisements and a second subset of the received stream advertisements, the first subset comprising stream advertisements for data streams relevant to the listener system, and the second subset comprising stream advertisements not relevant to the listener system.

9. The listener system of claim 1, where the stream reservation protocol stack is further configured to transmit all of the received stream advertisements to the upper layer application during operation in the full mode.

10. The listener system of claim 1, where the upper layer application is further configured to send a mode switch signal to the stream reservation protocol stack, the stream reservation protocol stack further operable to switch operation of the stream reservation protocol stack between the full mode and the sparse mode in response to the mode switch signal.

11. The listener system of claim 1, where the upper layer application is further configured to transmit the stream identifier to a sparse mode engine included in the stream reservation protocol stack.

12. The listener system of claim 11, where the sparse mode engine is configured to compare the stream identifier received from the upper layer application to the received stream advertisements.

13. A computer-implemented method of operating a stream reservation protocol stack of a listener system connected with an Ethernet Audio-Video Bridging ("AVB") network, the method comprising:

receiving, through the use of at least one processor, a plurality of stream advertisements from the Ethernet AVB network with a stream reservation protocol stack included in the listener system;

transmitting, through the use of the at least one processor, the plurality of stream advertisements to an upper layer application included in the listener system when the listener system is functioning in a full mode;

transmitting, through the use of the at least one processor, a first subset of the received stream advertisements to the upper layer application and not transmitting a second subset of the received stream advertisements to the upper layer application when the listener system is operating in a sparse mode;

receiving a query from the upper layer application, the query including at least one stream identifier for a data stream of interest to the listener system;

comparing the plurality of stream advertisements to the at least one stream identifier included in the query when operating in the sparse mode;

adding each stream advertisement of the plurality of stream advertisements that matches at least one of the at least one stream identifier for the data stream of interest to the first subset of the received stream advertisements based on the comparison; and adding all stream advertisements of the plurality of stream advertisements that do not match the at least one stream identifier for the data stream interest to the second subset of the received stream advertisements based on the comparison.

14. The method of claim 13, further comprising:

receiving a mode switch signal from the upper layer application, the mode switch signal switching a mode of operation of the stream reservation protocol stack between the full mode and the sparse mode.

15. The method of claim 13, where the data stream of interest comprises a data stream that the listener is configured to process and produce an output as a result of the processing of the data stream.

16. The method of claim 13, where the comparison comprises comparing the at least one stream identifier with a plurality of stream identifiers, each of the plurality of stream identifiers associated with each of the plurality of stream advertisements respectively.

17. A network communication system, comprising:
an Ethernet Audio-Video Bridging ("AVB") network;
a talker in communication with the Ethernet AVB network and configured to advertise a data stream on the Ethernet AVB network with a stream advertisement; and
a plurality of listeners in communication with the Ethernet AVB network and configured to operate in a sparse mode and in a full mode; and
where the plurality of listeners are further configured to compare the stream advertisement to one or more stream identifiers associated with one or more data streams of interest to the listener when operating in the sparse mode, where each of the plurality of listeners comprises:
a processor;
an upper layer application executable by the processor, and when executed by the processor, is configured to transmit the one or more stream identifiers associated with the one or more data streams of interest to the listener; and
a stream reservation protocol stack executable by the processor, and when executed by the processor, is configured to:
receive the one or more stream identifiers associated with the one or more data streams of interest to the listener;
receive the stream advertisement on the Ethernet AVB network from the talker, the stream advertisement comprising a stream identifier identifying the data stream being advertised by the talker; and
operate in a sparse mode and a full mode;
where the stream reservation protocol stack, when operating in the sparse mode, is further configured to:
transmit the stream advertisement received on the Ethernet AVB network to the upper layer application in response to the stream identifier identifying the data stream advertised by the talker included in the stream advertisement matching at least one of the one or more stream identifiers received by the stream reservation protocol stack, and
not transmit the stream advertisement received on the Ethernet AVB network to the upper layer application in response to the stream identifier identifying the data stream advertised by the talker included in the stream advertisement not matching the one or more stream identifiers received by the stream reservation protocol stack; and
where the stream reservation protocol stack, when operating in the full mode, is further configured not to compare the received stream advertisements with the one or more stream identifiers received by the stream reservation protocol stack.

18. The network communication system of claim 17, further comprising:
a controller in communication with the Ethernet AVB network, the talker, and the plurality of listeners;
where the controller is configured to identify the stream identifier uniquely identifying the data stream being advertised by the talker, determine a subset of the plurality of listeners that are interested in the advertised data stream, and transmit the stream identifier identifying the data stream being advertised by the talker to the subset of the plurality of listeners.

19. The system of claim 18, where the subset of the plurality of listeners comprises listeners configured to process the advertised data stream.

20. The system of claim 18, where each of the plurality listeners are further configured to receive the stream identifier identifying the data stream being advertised by the talker from the controller.

21. One or more non-transitory computer readable media tangibly embodying computer executable code for operating a stream reservation protocol stack of a listener system connected with an Ethernet Audio-Video Bridging ("AVB") network, said media comprising:
code for receiving a plurality of stream advertisements from the Ethernet AVB network with a stream reservation protocol stack included in the listener system;
code for transmitting the plurality of stream advertisements to an upper layer application included in the listener system when the listener system is functioning in a full mode;
code for transmitting a first subset of the received stream advertisements to the upper layer application and not transmitting a second subset of the received stream advertisements to the upper layer application when the listener system is operating in a sparse mode;
code for receiving a query from the upper layer application identifying a data stream of interest to the listener system;
code for comparing, when operating in the sparse mode, the plurality of stream advertisements to a stream identifier included in the query, the stream identifier uniquely identifying the data stream of interest;
code for adding, when operating in the sparse mode, each stream advertisement of the plurality of stream advertisements that matches the stream identifier to the first subset of the received stream advertisements based on the comparison; and
code for adding, when operating in the sparse mode, all stream advertisements of the plurality of stream advertisements that do not match the stream identifier to the second subset of the received stream advertisements based on the comparison.

22. The media of claim 21, further comprising:
code for receiving a mode switch signal from the upper layer application,
the mode switch signal switching a mode of operation of the stream reservation protocol stack between the full mode and the sparse mode.

23. The media of claim 21, where the data stream of interest comprises a data stream that the listener is configured to process and produce an output as a result of the processed data stream.

24. The media of claim 21, where the comparison comprises comparing the stream identifier with a plurality of stream identifiers, each of the plurality of stream identifiers associated with each of the plurality of stream advertisements respectively.

* * * * *